US011889196B2

(12) United States Patent
Nikhara et al.

(10) Patent No.: US 11,889,196 B2
(45) Date of Patent: Jan. 30, 2024

(54) SYSTEMS AND METHODS FOR DETERMINING IMAGE CAPTURE SETTINGS

(71) Applicant: QUALCOMM Incorporated, San Diego, CA (US)

(72) Inventors: Soman Ganesh Nikhara, Telangana (IN); Adinarayana Nuthalapati, Ongole (IN)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/457,881

(22) Filed: Dec. 6, 2021

(65) Prior Publication Data

US 2023/0179868 A1 Jun. 8, 2023

(51) Int. Cl.
*H04N 5/235* (2006.01)
*H04N 23/72* (2023.01)
*G06T 7/80* (2017.01)
*H04N 13/332* (2018.01)
*H04N 13/383* (2018.01)
(Continued)

(52) U.S. Cl.
CPC ............... *H04N 23/72* (2023.01); *G06T 7/80* (2017.01); *G06T 19/006* (2013.01); *H04N 13/332* (2018.05); *H04N 13/383* (2018.05); *H04N 23/71* (2023.01); *H04N 23/76* (2023.01); *H04N 23/90* (2023.01); *G06T 2207/10024* (2013.01); *G06T 2207/30244* (2013.01)

(58) Field of Classification Search
CPC .... H04N 23/72; H04N 13/332; H04N 13/383; H04N 23/76; H04N 23/71; H04N 23/90; G06T 7/80; G06T 19/006; G06T 2207/10024; G06T 2207/30244
See application file for complete search history.

(56) References Cited

U.S. PATENT DOCUMENTS

2001/0030695 A1* 10/2001 Prabhu ............... H04N 1/00973
348/333.01
2007/0002163 A1* 1/2007 Madej ..................... G06K 7/10
348/362
(Continued)

OTHER PUBLICATIONS

International Search Report and Written Opinion—PCT/US2022/080597—ISA/EPO—dated Mar. 17, 2023.

*Primary Examiner* — Terrell M Robinson
(74) *Attorney, Agent, or Firm* — QUALCOMM Incorporated

(57) ABSTRACT

An extended reality (XR) system receives capture information from a first camera with a first image sensor that faces a first direction, for instance facing an environment. The capture information is associated with capture of first image data by the first image sensor, for instance including the first image data and/or first image capture settings used to capture the first image data. The XR system determines an image capture setting, such as an exposure setting, for a second image sensor based on the capture information. The second image sensor faces second direction, for instance facing a user of the XR system. In some examples, the XR system determines the image capture setting also based on information from a display buffer for a display that faces the second direction. The XR system causes a second image sensor to capture second image data according to the image capture setting.

40 Claims, 11 Drawing Sheets

(51) Int. Cl.
    *H04N 23/76*     (2023.01)
    *H04N 23/71*     (2023.01)
    *H04N 23/90*     (2023.01)
    *G06T 19/00*     (2011.01)

(56) References Cited

U.S. PATENT DOCUMENTS

| | | | |
|---|---|---|---|
| 2009/0052776 A1* | 2/2009 | Panahpour Tehrani | H04N 9/68 |
| | | | 382/167 |
| 2013/0113973 A1* | 5/2013 | Miao | G02B 27/017 |
| | | | 348/E5.022 |
| 2015/0213303 A1 | 7/2015 | Jain | |
| 2018/0267605 A1 | 9/2018 | Border | |
| 2021/0099632 A1 | 4/2021 | Molholm | |
| 2021/0368094 A1* | 11/2021 | Li | G06N 20/00 |

* cited by examiner

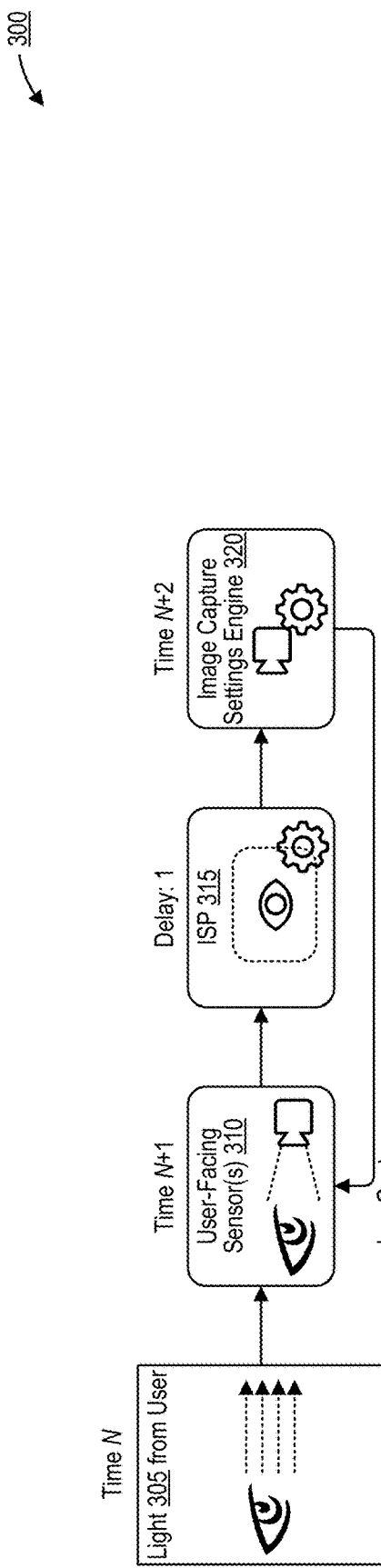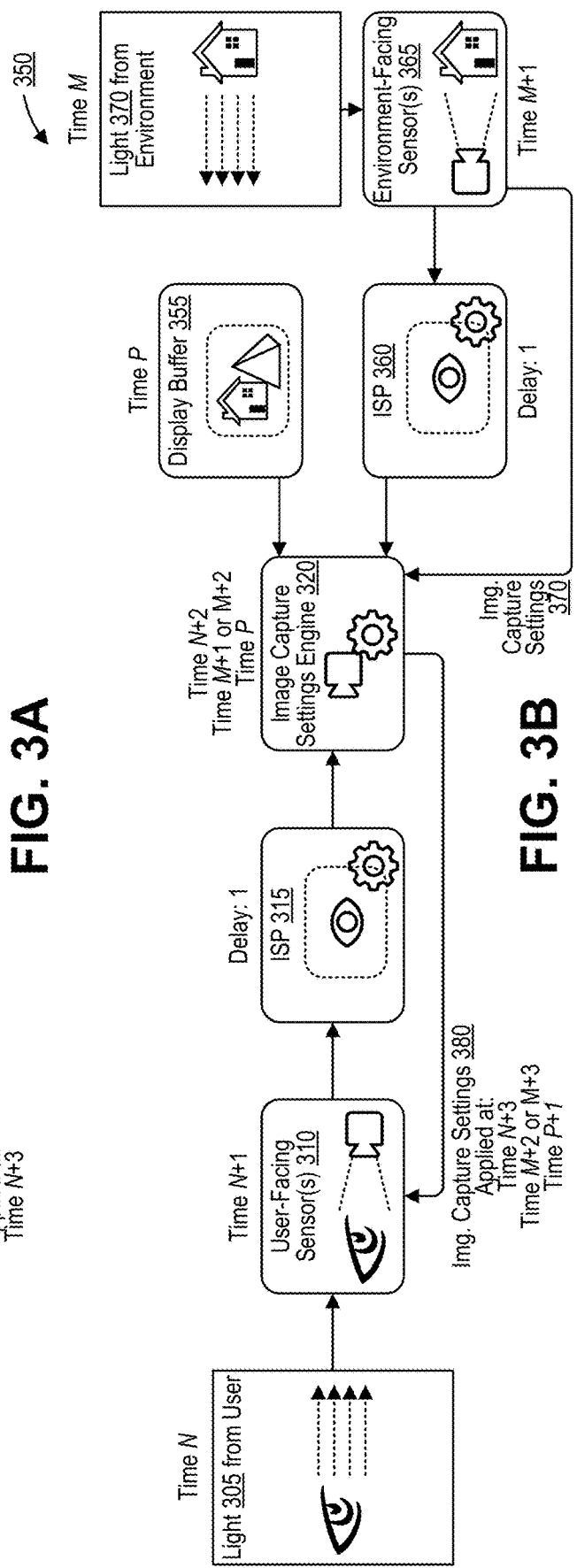
FIG. 3A
FIG. 3B

| Parameters 405 | Environment-Facing Sensor(s) 410 | User-Facing Sensor(s) 415 |
|---|---|---|
| Image Characteristic (e.g., Measure Of Pixel Brightness/luminance 420) | 50 | 60 |
| Image Capture Setting 425 (e.g., Exposure Time) | 20ms | 30ms |
| Image Capture Setting 430 (e.g., Gain) | 2 | 4 |

FIG. 4

SYSTEMS AND METHODS FOR DETERMINING IMAGE CAPTURE SETTINGS

FIELD

This application is related to image capture. More specifically, this application relates to systems and methods for determining image capture settings for an image sensor based on display content in a display buffer, image data captured by a second image sensor facing a different direction, and/or image capture settings of the second image sensor facing the different direction.

BACKGROUND

An extended reality (XR) device is a device that displays an environment to a user, for example through a head-mounted display (HMD) or other device. The environment is at least partially different from the real-world environment in which the user is in. The user can generally change their view of the environment interactively, for example by tilting or moving the HMD or other device. Virtual reality (VR) and augmented reality (AR) are examples of XR.

In some cases, an XR system can include a "see-through" display that allows the user to see their real-world environment based on light from the real-world environment passing through the display. In some cases, an XR system can include a "pass-through" display that allows the user to see their real-world environment, or a virtual environment based on their real-world environment, based on a view of the environment being captured by one or more cameras and displayed on the display. "See-through" or "pass-through" XR systems can be worn by users while the users are engaged in activities in their real-world environment.

A face of a user that uses an XR system can be illuminated at different levels of illumination at different times. In some cases, the user's face can be illuminated by light from the real-world environment around the user and the XR system. In some cases, the user's face can be illuminated by light from the display of the XR system.

BRIEF SUMMARY

In some examples, systems and techniques are described for automatic capture setting configuration for an extended reality (XR) system. The XR system receives capture information from a first camera with a first image sensor. The first image sensor faces a first direction, for instance facing an environment. The capture information is associated with capture of first image data by the first image sensor, for instance including the first image data and/or first image capture settings used to capture the first image data. The XR system determines an image capture setting, such as an exposure setting, for a second image sensor based on the capture information. The second image sensor faces second direction, for instance facing a user of the XR system. In some examples, the XR system determines the image capture setting also based on information from a display buffer for a display that faces the second direction. In some examples, the XR system determines the image capture setting also based on prior capture information from the second camera, such as prior image data captured by the second image sensor before capture of the second image data and/or prior image capture settings used by the second camera to capture the prior image data.

In one example, an apparatus for image processing is provided. The apparatus includes a memory and one or more processors (e.g., implemented in circuitry) coupled to the memory. The one or more processors are configured to and can: receive capture information from a first camera with a first image sensor, wherein the capture information is associated with capture of first image data by the first image sensor, and wherein the first image sensor faces a first direction; receive display data that is configured to be displayed using a display; based on the capture information and the display data, determine an image capture setting for a second camera that includes a second image sensor, wherein the second image sensor faces a second direction; and cause the second image sensor to capture second image data according to the image capture setting.

In another example, a method of image processing is provided. The method includes: receiving capture information from a first camera with a first image sensor, wherein the capture information is associated with capture of first image data by the first image sensor, and wherein the first image sensor faces a first direction; receiving display data that is configured to be displayed using a display; based on the capture information and the display data, determining an image capture setting for a second camera that includes a second image sensor, wherein the second image sensor faces a second direction; and causing the second image sensor to capture second image data according to the image capture setting.

In another example, a non-transitory computer-readable medium is provided that has stored thereon instructions that, when executed by one or more processors, cause the one or more processors to: receive capture information from a first camera with a first image sensor, wherein the capture information is associated with capture of first image data by the first image sensor, and wherein the first image sensor faces a first direction; receive display data that is configured to be displayed using a display; based on the capture information and the display data, determine an image capture setting for a second camera that includes a second image sensor, wherein the second image sensor faces a second direction; and cause the second image sensor to capture second image data according to the image capture setting.

In another example, an apparatus for image processing is provided. The apparatus includes: means for receiving capture information from a first camera with a first image sensor, wherein the capture information is associated with capture of first image data by the first image sensor, and wherein the first image sensor faces a first direction; means for receiving display data that is configured to be displayed using a display; means for based on the capture information and the display data, determining an image capture setting for a second camera that includes a second image sensor, wherein the second image sensor faces a second direction; and means for causing the second image sensor to capture second image data according to the image capture setting In some aspects, the image capture setting includes an exposure setting. In some cases, to cause the second image sensor to capture the second image data according to the image capture setting, the methods, apparatuses, and computer-readable medium described above further comprise setting an exposure parameter associated with the second camera according the exposure setting.

In some aspects, the image capture setting includes a white balance setting that based on color information associated with the capture information.

In some aspects, the capture information includes the first image data. In some aspects, the methods, apparatuses, and computer-readable medium described above further comprise determining a measure of luminance of at least a portion of the first image data. In some cases, to determine the image capture setting for the second camera based on the capture information and the display data, the methods, apparatuses, and computer-readable medium described above further comprise determining the image capture setting for the second camera based on the measure of luminance.

In some aspects, the capture information includes a second image capture setting. In some aspects, the first image sensor is configured to capture the first image data according to the second image capture setting.

In some aspects, the second image capture setting includes an exposure setting. In some aspects, the first image sensor is configured to capture the first image data with an exposure parameter of the first camera according to the exposure setting.

In some aspects, to determine the image capture setting for the second camera based on the capture information and the display data, the methods, apparatuses, and computer-readable medium described above further comprise determining the image capture setting for the second camera based on the second image capture setting and a look-up table. In some cases, the look-up table maps respective image capture settings between the first camera and the second camera. In some aspects, the image capture setting corresponds to the second image capture setting in the look-up table.

In some aspects, to receive the display data, the methods, apparatuses, and computer-readable medium described above further comprise receiving the display data from a display buffer that stores the display data before the display data is displayed using the display.

In some aspects, the methods, apparatuses, and computer-readable medium described above further comprise determining a measure of luminance of at least a portion of the display data. In some cases, to determine the image capture setting for the second camera based on the capture information and the display data, the methods, apparatuses, and computer-readable medium described above further comprise determining the image capture setting for the second camera based on the measure of luminance.

In some aspects, the apparatus includes the display configured to display the display data.

In some cases, the display is configured to direct light corresponding to the display data toward the second direction.

In some aspects, the display data includes image content captured by the first image sensor.

In some aspects, the methods, apparatuses, and computer-readable medium described above further comprise generating virtual content that is distinct from content captured by the first image sensor. In some cases, the display data includes virtual content.

In some aspects, the display is at least partially transmissive to light passing from the first direction to the second direction.

In some aspects, the methods, apparatuses, and computer-readable medium described above further comprise receiving second image capture information from the second camera. In some cases, the second image capture information is associated with capture of third image data by the second image sensor before capture of the second image data by the second image sensor. In some aspects, to determine the image capture setting for the second camera based on the capture information and the display data, the methods, apparatuses, and computer-readable medium described above further comprise determining the image capture setting for the second camera based on the capture information and the second image capture information and the display data.

In some aspects, the second image capture information includes the third image data.

In some aspects, the methods, apparatuses, and computer-readable medium described above further comprise determining a measure of luminance of at least a portion of the third image data. In some cases, to determine the image capture setting for the second camera based on the capture information and the second image capture information and the display data, the methods, apparatuses, and computer-readable medium described above further comprise determining the image capture setting for the second camera based on the measure of luminance.

In some aspects, the second image capture information includes a second image capture setting. In some cases, the second image sensor captures the third image data according to the second image capture setting.

In some aspects, the methods, apparatuses, and computer-readable medium described above further comprise determining a level of illumination of a portion of a user based on the capture information and the display data. In some cases, to determine the image capture setting for the second camera based on the capture information, the methods, apparatuses, and computer-readable medium described above further comprise determining the image capture setting for the second image sensor based on the level of illumination of the portion of the user.

In some aspects, to determine the level of illumination of the portion of the user, the methods, apparatuses, and computer-readable medium described above further comprise determining the level of illumination of the portion of the user based on the capture information and on second image capture information that is associated with capture of third image data by the second image sensor before capture of the second image data by the second image sensor.

In some aspects, the methods, apparatuses, and computer-readable medium described above further comprise: receiving the second image data captured by the second image sensor; and outputting the second image data.

In some aspects, the methods, apparatuses, and computer-readable medium described above further comprise: receiving the second image data captured by the second image sensor; and determining a position of an eye of a user based on the second image data.

In some aspects, the first direction faces toward an environment, and the second direction faces toward at least a portion of a user.

In some aspects, the first direction is parallel and opposite to the second direction.

In some aspects, the first image data includes a depiction of at least a portion of an environment, and the second image data includes a depiction of at least a portion of a user.

In some aspects, the second image data includes a depiction of one or more eyes of a user.

In some aspects, the apparatus includes the first image sensor and the second image sensor.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 3A is a block diagram illustrating an example extended reality (XR) process that generates combined image capture setting(s) for user-facing sensor(s) based on information associated with the user-facing sensor(s), in accordance with some examples;

FIG. 3B is a block diagram illustrating an example extended reality (XR) process that generates image capture settings for user-facing sensor(s) based on information associated with a display buffer, information associated with environment-facing sensor(s), and/or information associated with the user-facing sensor(s), in accordance with some examples;

FIG. 4 is a table illustrating examples of information associated with environment-facing sensor(s) and corresponding information associated with user-facing sensor(s), in accordance with some examples;

DETAILED DESCRIPTION

Figure 1:
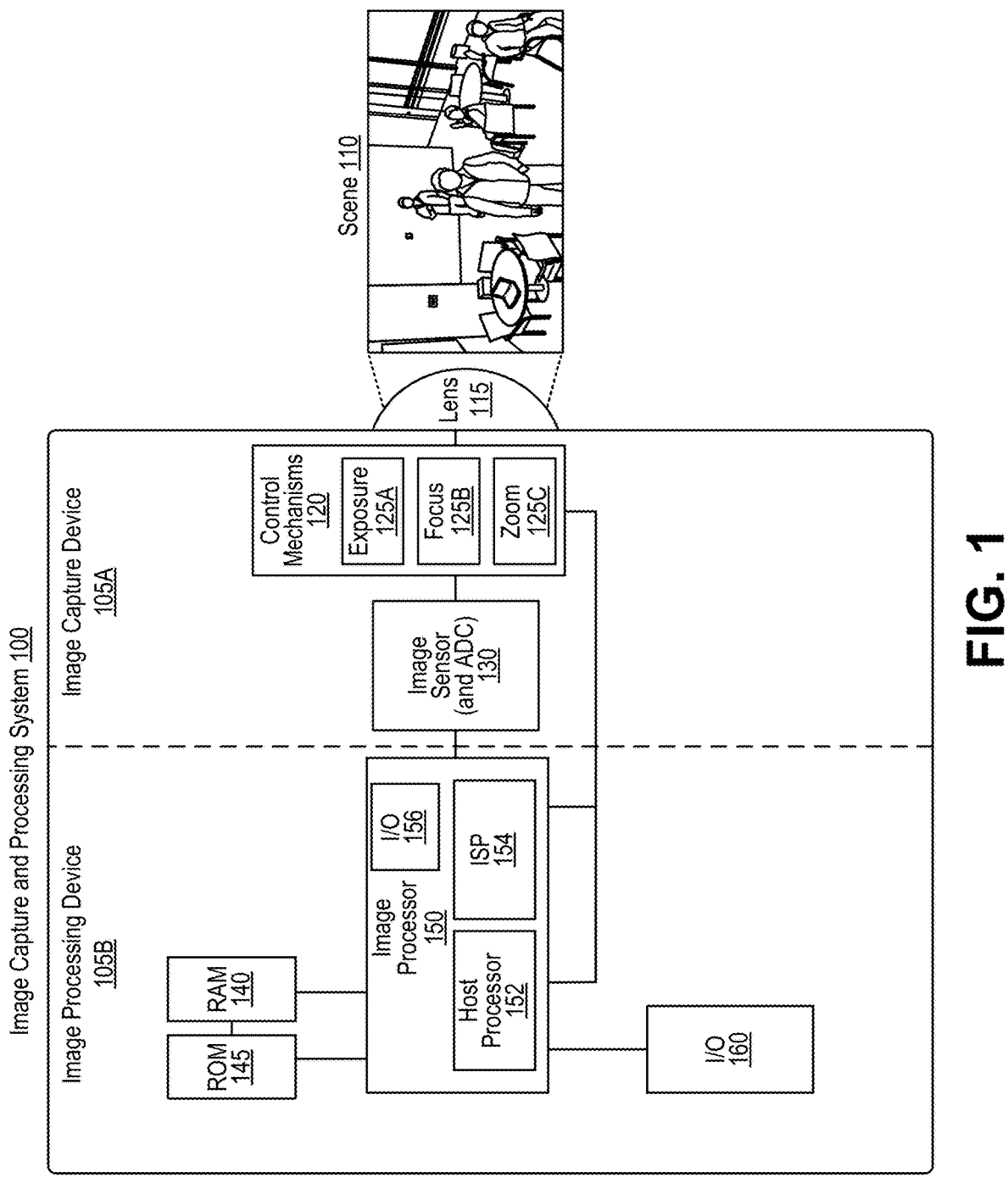
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

A face of a user that uses an XR system can be illuminated at different levels of illumination at different times. In some cases, the user's face can be illuminated by light from the real-world environment around the user and the XR system. In some cases, the user's face can be illuminated by light from the display of the XR system.

An XR system can include one or more user-facing sensors that face the user, such as user-facing image sensors that face the user. For instance, the user-facing sensors can face the user's face, eyes, one or more other portions of the user's body, or a combination thereof. Depending on the illumination of the user's face, different image capture settings may be appropriate for a user-facing sensor to use. For instance, if the user's face is brightly illuminated by their environment and/or by the display of the XR system, then it may be useful to use image capture settings with low exposure settings (e.g., short exposure time, small aperture size, and/or low ISO) and/or low gain settings (e.g., low analog gain and/or low digital gain) for the user-facing sensors. On the other hand, if the user's face is dimly illuminated by their environment and/or by the display of the XR system, then it may be useful to use image capture settings with high exposure settings (e.g., long exposure time, large aperture size, and/or high ISO) and/or high gain settings (e.g., high analog gain and/or high digital gain) for the user-facing sensors.

An XR system can determine image capture settings for the user-facing sensors based on prior capture information from the user-facing sensors. The prior capture information can include, for instance, prior sensor data (e.g., prior images) captured by the user-facing sensors, prior image capture settings used by the user-facing sensors to capture the prior sensor data, or combinations thereof. However, reliance on prior capture information to determine the image capture settings for the user-facing sensors can cause delays in changing the image capture settings to accommodate changes in lighting conditions. For instance, if lighting conditions illuminating the user's face change rapidly, in some cases it may take at least three frames for such an XR system to determine and set new image capture settings for the user-facing sensors that are appropriate for the changed lighting conditions if the XR system relies on prior capture information.

Systems and techniques are described herein for automatic image capture setting configuration for an extended reality (XR) system. The XR system receives capture information from a first camera with a first image sensor. The first image sensor faces a first direction, for instance facing an environment. The capture information is associated with capture of first image data by the first image sensor. In some examples, the capture information includes the first image data and/or first image capture settings that the first image sensor captures the first image data according to. The XR system determines an image capture setting, such as an exposure setting, for a second image sensor based on the capture information. The second image sensor faces second direction, for instance facing a user of the XR system. In some examples, the XR system determines the image capture setting also based on information from a display buffer for a display of the XR system. In some examples, the display faces the second direction (e.g., faces the user). In some examples, the XR system determines the image capture setting also based on the prior capture information from the second camera. The prior capture information can include, for instance, prior sensor data (e.g., prior images) captured by the user-facing sensors, prior image capture settings used by the user-facing sensors to capture the prior sensor data, or combinations thereof. The XR system can receive the second image data from the second image sensor.

In some examples, the XR system uses the second image data for eye tracking. In some examples, the XR system uses the second image data to determine eye position(s) of the eye(s) of the user, to track eye position(s) of the eye(s) of the user, to track eye movement(s) of the eye(s) of the user, to track pupil dilation(s) of the eye(s) of the user, to track saccade(s) of the eye(s) of the user, to track fixation(s) by the eye(s) of the user, to track blinking by the eyelid(s) of the user, to track squinting by the eyelid(s) of the user, to track optokinetic reflex(es) by the eye(s) of the user, to track vestibulo-ocular reflex(es) by the eye(s) of the user, to track accommodation reflex(es) by the eye(s) of the user, to track facial expressions of the user, to track gestures by the user, or combinations thereof. Tracking, in the operations listed above, can refer to tracking of timing, frequency, extent, amplitude, eye position, eye movement, or a combination thereof. In some examples, the XR system outputs the second image data, for instance by displaying the second image data and/or transmitting the second image data to a recipient device.

In some examples, the XR systems and techniques described herein determine an image capture setting for the second sensor (e.g., facing the user) based on capture information from the first sensor (e.g., facing the environment), based on display buffer data from a display buffer, and/or based on the prior capture information for the second sensor. In some examples, the XR systems and techniques described herein provide numerous technical advantages and benefits over XR systems that determine an image capture setting for the second sensor (e.g., facing the user)

based only on the prior capture information for the second sensor. In some examples, the XR systems and techniques described herein provide improvements to the speed with which an XR system can determine the image capture setting for the second sensor, for instance because analysis of the prior capture information for the second sensor for the image capture setting determination can be hindered by delays caused by processing the prior capture information and/or transferring the prior capture information between components of the XR system. Use of the display buffer data from the display buffer as a basis for the determination of the image capture setting can speed up determination of image capture setting and allow the image capture setting to be determined and/or used contemporaneously with display of the display buffer data by the display, or within a short delay (e.g., less than the delay for the prior capture information) after display of the display buffer data by the display. Use of the capture information from the first sensor (e.g., facing the environment) as a basis for the determination of the image capture setting can speed up determination of image capture setting and allow the image capture setting to be determined and/or used based on image capture settings used for the first sensor, which may be fast as no image capture or processing are required. Use of the capture information from the first sensor (e.g., facing the environment) as a basis for the determination of the image capture setting can speed up determination of image capture setting and allow the image capture setting to be determined and/or used based on detecting changes to levels of light in the environment before the levels of illumination of the user's face change. For instance, if a user is approaching a region of the environment with different lighting than the region that the user was in previously, this difference in lighting may be detectable using first image data captured by the first sensor (e.g., facing the environment) before the corresponding difference in user illumination is detectable using second image data to be captured by the second sensor (e.g., facing the user). This reduces delays and latencies (e.g., by 2 frames) in adjusting image capture setting(s) of the second sensor in response to changes in lighting conditions in the environment and/or due to changes in light patterns emitted by the display. This makes the XR system described herein more efficient, adaptive, and responsive in adjusting image capture setting(s) of the second sensor in response to changes in lighting conditions in the environment and/or due to changes in light patterns emitted by the display. This can reduce or eliminate instances where the second image sensor captures image data with inappropriate image capture setting(s), which may result in images that are overexposed or underexposed, for example. This, in turn, can improve the quality, consistency, and accuracy of the XR system's ability to track eye positions, eye movements, facial expressions, gestures, and the like. In some examples, the XR system described herein can also independently control image capture settings for user-facing sensor(s) and thus reduce processor load.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing system 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1020, read-only memory (ROM) 145 and/or 1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
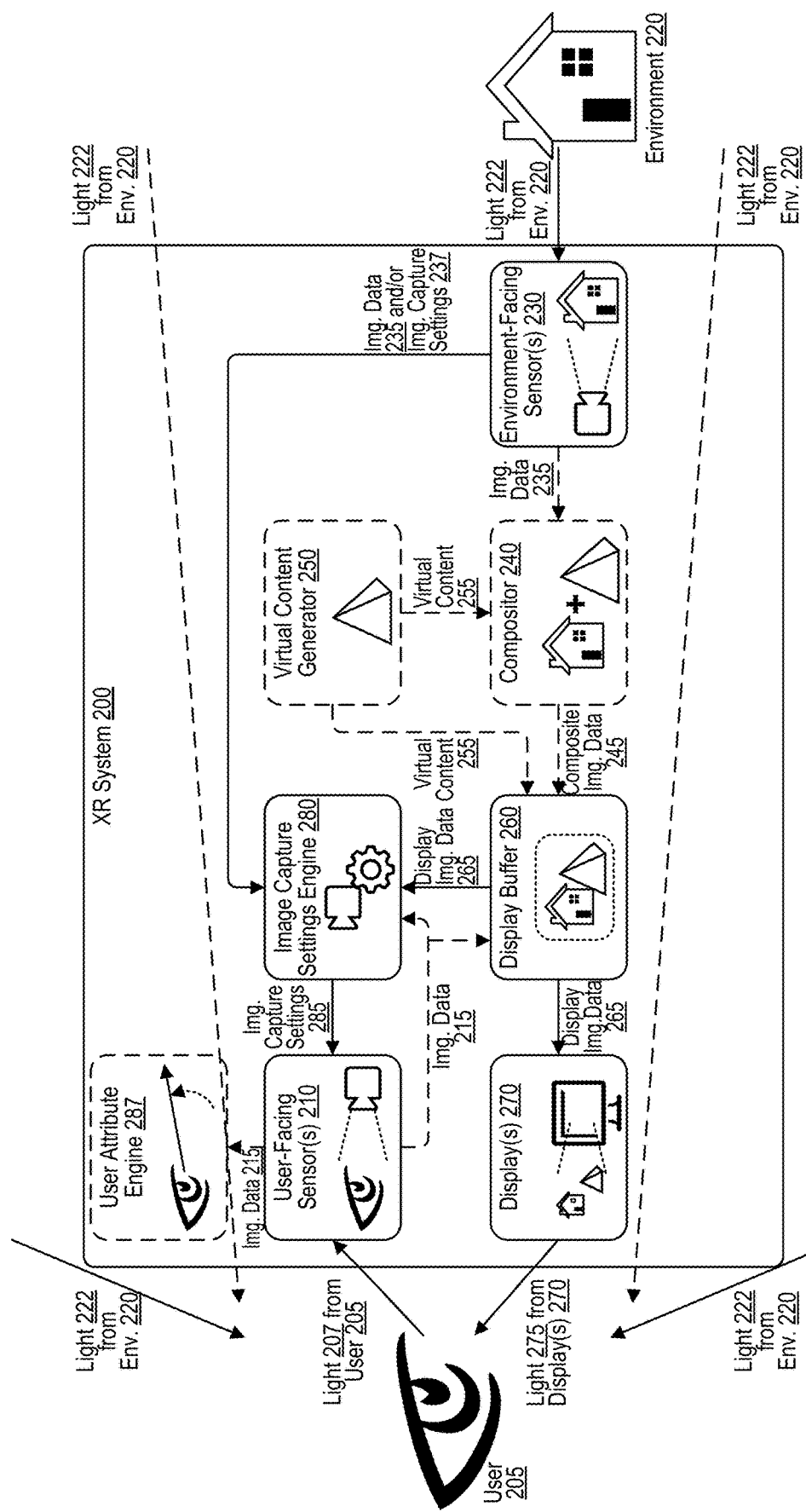
FIG. 2A is a block diagram illustrating an example architecture of an extended reality (XR) system that generates image capture settings for user-facing sensor(s) based on information associated with a display buffer, information associated with environment-facing sensor(s), and/or information associated with the user-facing sensor(s), in accordance with some examples.

FIG. 2A is a block diagram illustrating an example architecture of an extended reality (XR) system 200 that generates image capture settings 285 for user-facing sensor(s) 210 based on information associated with a display buffer 260, information associated with environment-facing sensor(s) 230, and/or information associated with the user-facing sensor(s) 210. In some examples, the XR system 200 includes at least one image capture and processing system 100, image capture device 105A, image processing device 105B, or combination(s) thereof. In some examples, the XR system 200 includes at least one computing system 1000.

The XR system 200 includes one or more user-facing sensors 210. The one or more user-facing sensors 210 face a direction. In some examples, the direction that the one or more user-facing sensors 210 face is a direction of the user 205. The user-facing sensors 210 capture sensor data measuring and/or tracking information about aspects of the user's body and/or behaviors by the user. In some examples, the user-facing sensors 210 include one or more cameras that face a direction of at least a portion of the user 205. The one or more cameras of the user-facing sensors 210 can include one or more image sensors that receive light 207 from the user 205. The one or more image sensors of the user-facing sensors 210 can capture image data 215 that includes one or more images (or portions thereof) of at least a portion of the user 205 in response to receiving the light 207 from the user 205. The image data 215 can depict at least a portion of the user 205. In some examples, the one or more user-facing sensors 210 include one or more cameras that face at least a portion of a face of the user 205. The image sensors of the user-facing sensors 210 can capture image data 215 that includes one or more images of at least a portion of the face of the user 205. In some examples, the one or more user-facing sensors 210 include one or more cameras that face at least a portion of one or both eyes (and/or eyelids) of the user 205. The image sensors of the user-facing sensors 210 can capture image data 215 that includes one or more images of at least a portion of one or both eyes (and/or eyelids) of the user 205.

Camera(s) of the one or more user-facing sensors 210 of the can capture image data 215 that includes capture of a series of images over time, which in some examples may be sequenced together in temporal order, for instance into videos. These series of images can depict or otherwise indicate, for instance, position(s) of the user 205's eye(s), movement(s) of the user 205's eye(s), position(s) of the user 205's eyelid(s), movement(s) of the user 205's eyelid(s), position(s) of the user 205's eyebrow(s), movement(s) of the user 205's eyebrow(s), pupil dilation(s) of the user 205's eye(s), fixation(s) by the user 205's eye(s), eye moisture level(s) of the user 205's eye(s), blinking of the user 205's eyelid(s), squinting of the user 205's eyelid(s), saccade(s) of the user 205's eye(s), optokinetic reflex(es) of the user 205's eye(s), vestibulo-ocular reflex(es) of the user 205's eye(s), accommodation reflex(es) of the user 205's eye(s), or combinations thereof. Within FIGS. 2A-2B, the one or more user-facing sensors 210 are illustrated as a camera facing an eye of the user 205 and capturing image data 215 of the eye of the user 205. The user-facing sensors 210 can include one or more sensors that track information about the user's body and/or behaviors. The one or more sensors of the user-facing sensors 210 can include one or more cameras, ambient light sensors, microphones, heart rate monitors, oximeters, biometric sensors, positioning receivers, Global Navigation Satellite System (GNSS) receivers, Inertial Measurement Units (IMUs), accelerometers, gyroscopes, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the user-facing sensor(s) 210 include one or more respective sensor(s) per eye of the user 205. In some examples, the user-facing sensor(s) 210 include one or more sensor(s) for both eyes of the user 205. In some examples, the one or more user-facing sensors 210 include at least one image capture and processing system 100, image capture device 105A, image processing device 105B, or combination(s) thereof. In some examples, the one or more user-facing sensors 210 include at least one input device 1045 of the computing system 1000, or are themselves an input device 1045 of the computing system 1000.

Figure 2B:
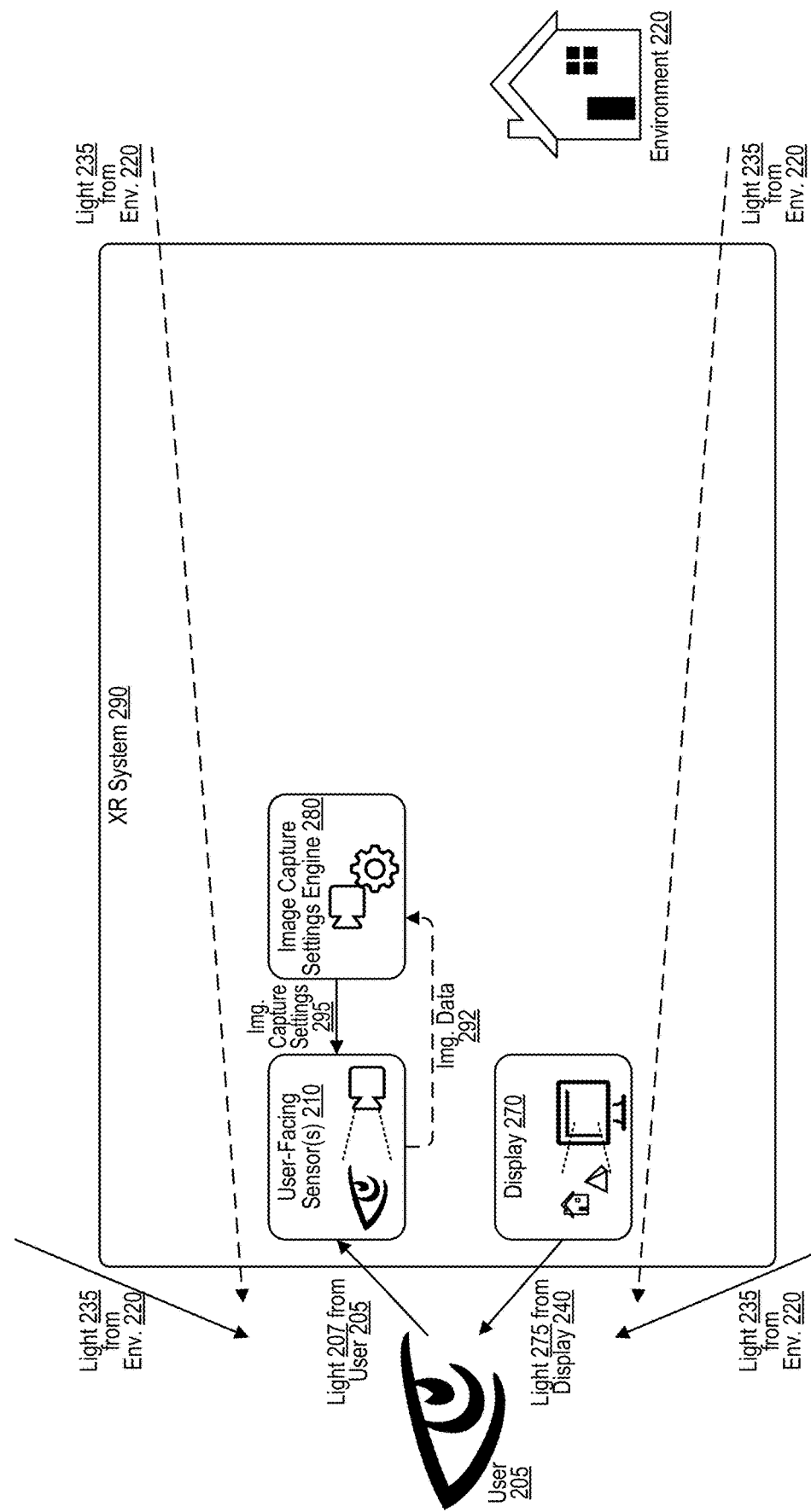
FIG. 2B is a block diagram illustrating an example architecture of an extended reality (XR) system that generates image capture settings for user-facing sensor(s) based on information associated with the user-facing sensor(s), in accordance with some examples.

The XR system 200 includes one or more environment-facing sensors 230. The one or more environment-facing sensors 230 of the XR system 200 include one or more sensors that face a direction that is different from the direction that the one or more user-facing sensors 210 face. For instance, the one or more environment-facing sensors 230 face a first direction, while the one or more user-facing sensors 210 face a second direction. In some examples, the first direction and the second direction are parallel to one another and/or opposite one another. For instance, as illustrated in FIG. 2A, the one or more environment-facing sensors 230 face right, while the one or more user-facing sensors 210 face left—with left and right being parallel and opposite directions. In some examples, the one or more environment-facing sensors 230 of the XR system 200 face at least a portion of an environment 220. The environment 220 is illustrated in FIGS. 2A-2B as including a house. The environment 220 may include a real-world environment around the user 205 and/or around the XR system 200. The user 205 and/or around the XR system 200 may be in the environment 220. In some examples, the one or more environment-facing sensors 230 of the XR system 200 face away from at least a portion of the user 205. In some examples, the one or more user-facing sensors 210 away from at least the portion of the environment 220 that the one or more environment-facing sensors 230 face. In some examples, the one or more environment-facing sensors 230 of the XR system 200 face a direction that the user 205, and/or a front side of the XR system 200, is facing.

The one or more environment-facing sensors 230 capture sensor data that measures and/or tracks information about the environment 220. In some examples, the environment-facing sensors 230 include one or more cameras that face at least a portion of the environment 220. The one or more cameras can include one or more image sensors that can face at least the portion of the environment 220. The one or more cameras of the environment-facing sensors 230 can include one or more image sensors that receive light 222 from the environment 220. The one or more image sensors of the environment-facing sensors 230 can capture image data 235 that includes one or more images (or portions thereof) of at least a portion of the environment 220 in response to receiving the light 222 from the environment 220. In some examples, the one or more image sensors of the one or more environment-facing sensors 230 capture image data 235 of the environment 220. The image data 235 can include one or more images, or portion(s) thereof. The image sensor(s) of the one or more environment-facing sensors 230 can capture image data 235 that includes capture of a series of images over time, which in some examples may be sequenced together in temporal order, for instance into videos. The image data 235 captured by the one or more environment-facing sensors 230 can include images of, and/or images depicting, portions of the environment 220, for instance including elements such as floors, ground, walls, ceilings, sky, water, plants, other people other than the user 205, portions of the user 205's body (e.g., arms or legs), structures, vehicles, animals, devices, other objects, or combinations thereof. Within FIG. 2A, the one or more environment-facing sensors 230 are illustrated as a camera facing a house (an example of a structure).

The environment-facing sensors 230 can include one or more sensors, such as one or more cameras, ambient light sensors, microphones, positioning receivers, Global Navigation Satellite System (GNSS) receivers, Inertial Measurement Units (IMUs), accelerometers, gyroscopes, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the environment-facing sensor(s) 230 include one or more respective sensor(s) per eye of the user 205. In some examples, the environment-facing sensor(s) 230 include one or more sensor(s) corresponding to both eyes of the user 205. In some examples, the one or more environment-facing sensors 230 include at least one image capture and processing system 100, image capture device 105A, image processing device 105B, or combination(s) thereof. In some examples, the one or more environment-facing sensors 230 include at least one input device 1045 of the computing system 1000, or are themselves an input device 1045 of the computing system 1000.

The XR system 200 includes one or more displays 270. The display(s) 270 can include any type of display screen and/or projector. In some examples, the display(s) 270 can include one or more respective display(s) per eye of the user 205. In some examples, the display(s) 270 can include one or more display(s) for both eyes of the user 205. The display(s) 270 can display display image data 265. The display image data 265 can include one or more images, and/or portion(s) thereof. The display image data 265 may be stored in a display buffer 260 (at least temporarily) before and/or during display of the display image data 265 by the display(s) 270. In some examples, the display image data 265 include at least a portion of the image data 235 captured by the environment facing sensor(s) 230, at least a portion of virtual content 255 generated by a virtual content generator 250 of the XR system 200, at least a portion of the image data 215 captured by the user-facing sensor(s) 210, at least a portion of composite image data 245 generated by a compositor 240 of the XR system 200, or a combination thereof.

The virtual content generator 250 of the XR system 200 can include a content renderer that can generate and/or render visual content that is not present in the environment 220. The virtual content 255 can include one or more two-dimensional (2D) shapes, three-dimensional (3D) shapes, 2D objects, 3D objects, 2D models, 3D models, 2D animations, 3D animations, 2D images, 3D images, textures, portions of other images, alphanumeric characters, strings of alphanumeric characters, other virtual content discussed herein, or combinations thereof. Within FIG. 2A, the virtual content 255 generated by the virtual content generator 250 is illustrated in the block corresponding to the virtual content generator 250 as a tetrahedron. In some examples, the virtual content generator 250 includes a software element, such as a set of instructions corresponding to a program, that is run on a processor such as the processor 1010 of the computing system 1000, the image processor 150, the host processor 152, the ISP 154, or a combination thereof. In some examples, the virtual content generator 250 includes one or more hardware elements. For instance, the virtual content generator 250 can include a processor such as the processor 1010 of the computing system 1000, the image processor 150, the host processor 152, the ISP 154, or a combination thereof. In some examples, the virtual content generator 250 includes a combination of one or more software elements and one or more hardware elements.

The compositor 240 of the XR system 200 can generate composite image data 245 by combining at least a portion of the image data 235 captured by the environment-facing sensor(s) 230, the virtual content 255 generated by the virtual content generator 250, the image data 215 captured by the user-facing sensor(s) 210, or a combination thereof.

The composite image data 245 can include one or more images, and/or portion(s) thereof. In some examples, the compositor 240 incorporates at least a portion of the virtual content 255 over the image data 235 and/or over the image data 215 to generate the composite image data 245. In some examples, the compositor 240 can overlay at least a portion of the virtual content 255 over the image data 235 and/or over the image data 215 to generate the composite image data 245. In some examples, the compositor 240 underlays at least a portion of the virtual content 255 over the image data 235 and/or over the image data 215 to generate the composite image data 245. The compositor 240 can determine where and how to position the virtual content 255 relative to the image data 235 and/or the image data 215. Within FIG. 2A, the composite image data 245 generated by the compositor 240 is illustrated in the block corresponding to the compositor 240 as a combination of the house that represents the environment 220 and the tetrahedron that represents the virtual content 255. In some examples, the composite image data 245 is sent to the display buffer 260, in which case the display image data 265 may include the composite image data 245. Within FIG. 2A, the display image data 265 stored by the display buffer 260 is illustrated within the block corresponding to the display buffer 260 as an image depicting a combination of the house that represents the environment 220 and the tetrahedron that represents the virtual content 255. In some examples, the compositor 240 includes a software element, such as a set of instructions corresponding to a program, that is run on a processor such as the processor 1010 of the computing system 1000, the image processor 150, the host processor 152, the ISP 154, or a combination thereof. In some examples, the compositor 240 includes one or more hardware elements. For instance, the compositor 240 can include a processor such as the processor 1010 of the computing system 1000, the image processor 150, the host processor 152, the ISP 154, or a combination thereof. In some examples, the compositor 240 includes a combination of one or more software elements and one or more hardware elements.

The user 205, or portion(s) of the user 205 that are captured by the user-facing sensor(s) 210 (e.g., the user 205's eyes), can be illuminated by light from one or more sources of light. For instance, at least a portion of the user 205 can be illuminated by the light 222 from the environment 220. The light 222 from the environment 220 can in some cases illuminate at least a portion of the user 205, such as the eye(s), eyelid(s), eyebrow(s), nose, mouth, ears, and/or face of the user 205. The light 222 from the environment 220 can reach at least a portion of the user 205 by approaching at least the portion of the user 205 from around the XR system 200. In some examples, the light 222 from the environment 220 can reach at least a portion of the user 205 by passing through at least a portion of the XR system 200, as illustrated by the dashed arrows passing through the entire width of the XR system 200 in FIG. 2A. For instance, the light 222 from the environment 220 can reach at least a portion of the user 205 by passing through at least a portion of one or more of the display(s) 270 of the XR system 200 in cases where the at least one of the display(s) 270 is see-through, transparent, translucent, light-permissive, and/or light-transmissive.

At least a portion of the user 205 can be illuminated by the light 275 from the display(s) 270 while the display(s) 270 are displaying content, such as the display image data 265 from the display buffer 260. Display of the display image data 265 by the display(s) 270 can emit light 275 from the display(s) 270 toward at least a portion of user 205. The light 275 from the display(s) 270 can in some cases illuminate at least a portion of the user 205, such as the eye(s), eyelid(s), eyebrow(s), nose, mouth, ears, and/or face of the user 205.

The XR system 200 includes an image capture settings engine 280 that determines one or more image capture settings 285 for the user-facing sensor(s) 210. The user-facing sensor(s) 210 capture the image data 215 according to the image capture setting(s) 285. In some examples, the image capture settings engine 280 determines the image capture setting(s) 285 for the user-facing sensor(s) 210 based on a level of illumination of, or an estimated level of illumination of, at least a portion of the user 205 that is to be captured and/or depicted in the image data 215 by the user-facing sensor(s) 210. In some examples, the image capture settings engine 280 includes a software element, such as a set of instructions corresponding to a program, that is run on a processor such as the processor 1010 of the computing system 1000, the image processor 150, the host processor 152, the ISP 154, or a combination thereof. In some examples, the image capture settings engine 280 includes one or more hardware elements. For instance, the image capture settings engine 280 can include a processor such as the processor 1010 of the computing system 1000, the image processor 150, the host processor 152, the ISP 154, or a combination thereof. In some examples, the compositor 240 includes a combination of one or more software elements and one or more hardware elements.

In FIG. 2A, the image capture engine 280 receives image capture information from the environment-facing sensor(s) 230 and/or related components, such as a second image capture settings engine corresponding to the environment-facing sensor(s) 230. In some examples, the image capture information that the image capture settings engine 280 receives from the environment-facing sensor(s) 230 and/or related components includes the image data 235 captured by the environment-facing sensor(s) 230, the image capture settings 237 that the environment-facing sensor(s) 230 captured the image data 235 according to, or a combination thereof. In some examples, the image capture settings 237 include exposure settings (e.g., exposure time, aperture size, and/or ISO) and/or gain settings (e.g., analog gain and/or digital gain). In FIG. 2A, the image capture engine 280 receives the display image data 265 from the display buffer 260. In some examples, the image capture engine 280 receives the display image data 265 from the display buffer 260 before the display image data 265 is displayed by the display(s) 270. In some examples, the image capture engine 280 receives the display image data 265 from the display buffer 260 as the display image data 265 is being displayed by the display(s) 270. In some examples, the image capture engine 280 receives the display image data 265 from the display buffer 260 after the display image data 265 is displayed by the display(s) 270. In some examples, the image capture engine 280 receives and/or stores prior capture information associated with the user-facing sensor(s) 210 and/or the image capture engine 280. In some examples, the image capture engine 280 receives and/or stores prior sensor data (e.g., prior image data) captured by the user-facing sensor(s) 210 before the user-facing sensor(s) 210 capture the image data 215. In some examples, the image capture engine 280 stores prior image capture setting(s) previously generated by the image capture engine 280 before generation of the image capture setting(s) 285 by the image capture engine 280. In some examples, the prior image capture settings include exposure settings (e.g., exposure time, aperture size, and/or ISO) and/or gain settings (e.g., analog gain and/or digital gain). The prior capture information associated with the user-facing sensor(s) 210 and/or the image capture engine 280 can include the prior sensor data and/or the prior image capture setting(s).

The image capture engine 280 generates the image capture setting(s) 285 based on the image data 235, the image capture settings 237, the display image data 265, the prior sensor data from the user-facing sensor(s) 210, the prior image capture setting(s) from the image capture engine 280, or a combination thereof. In some examples, the image capture setting(s) 285 include exposure settings (e.g., exposure time, aperture size, and/or ISO) and/or gain settings (e.g., analog gain and/or digital gain). The image capture engine 280 can determine and/or estimate a level of illumination of at least a portion of the user 205 (e.g., at least a portion of the user 205's face) based on the image data 235, the image capture settings 237, the display image data 265, the prior sensor data from the user-facing sensor(s) 210, the prior image capture setting(s) from the image capture engine 280, or a combination thereof. The image capture engine 280 can generate the image capture setting(s) 285 based on the level of illumination. For instance, if the user 205's face is brightly illuminated by the light 222 from the environment 220 and/or by the light 275 from the display(s) 270, which corresponds to a high level of illumination of the user 205's face, then the image capture engine 280 can generate the image capture setting(s) 285 to include low exposure settings (e.g., short exposure time, small aperture size, and/or low ISO) and/or low gain settings (e.g., low analog gain and/or low digital gain) so that the user 205's face does not appear overexposed in the image data 215. On the other hand, if the user 205's face is dimly illuminated (e.g., the light 222 from the environment 220 is dim and/or the light 275 from the display(s) 270 is dim), which corresponds to a low level of illumination of the user 205's face, then the image capture engine 280 can generate the image capture setting(s) 285 to include high exposure settings (e.g., long exposure time, large aperture size, and/or high ISO) and/or high gain settings (e.g., high analog gain and/or high digital gain) so that the user 205's face does not appear underexposed in the image data 215. Examples of processes for generation of the image capture setting(s) 285 by the image capture engine 280 of FIG. 2A, or portions of such processes, are illustrated at least in FIGS. 3B, 5, and 6.

In some examples, the display(s) 270 of the XR system 200 include a "see-through" display that allows light from the real-world environment around the XR system 200 to pass through at least one of the display(s) 270 to reach one or both eyes of the user 205. For example, the display(s) 270 can be at least partially transparent, translucent, light-permissive, light-transmissive, or a combination thereof. In an illustrative example, the display(s) 270 includes a transparent, translucent, light-permissive, and/or light-transmissive lens and a projector. The projector projects display image data 265 (e.g., including the virtual content 255) onto the lens. The lens may be, for example, a lens of a pair of glasses, a lens of a goggle, a contact lens, a lens of a head-mounted display (HMD) device, or a combination thereof. The light 222 from the environment 220 passes through the lens and reaches one or both eyes of the user 205. Because the projector projects the display image data 265 onto the lens, the display image data 265 appears to be overlaid over the user's view of the environment 220 from the perspective of one or both of the user 205's eyes. The positioning of the display image data 265 as projected onto the lens by the projector can be identified and/or indicated by display settings. The compositor 240 can determine and/or modify the display settings.

In some examples, the display(s) 270 of the XR system 200 includes a projector without the lens discussed above with respect to the see-through display. Instead, the display(s) 270 can use its projector to project the display image data 265 onto one or both eyes of the user 205. In such examples, the light projected by the projector onto one or both eyes of the user 205 to project the display image data 265 onto one or both eyes of the user 205 can be the light 275 from the display(s) 270. In some examples, the projector of the display(s) 270 can project the display image data 265 onto one or both retinas of one or both eyes of the user 205. Such a display(s) 270 can be referred to as a see-through display, a virtual retinal display (VRD), a retinal scan display (RSD), or a retinal projector (RP). The light 222 from the environment 220 still reaches one or both eyes of the user. Because the projector projects the display image data 265 onto one or both eyes of the user 205, the display image data 265 appears to be overlaid over the user 205's view of the environment 220 from the perspective of one or both of the user 205's eyes. The positioning of the display image data 265 as projected onto one or both eyes of the user 205 by the projector can be identified and/or indicated by display settings. The compositor 240 can determine and/or modify the display settings.

In some examples, the XR system 200 is a "pass-through" display system that allows the user to see a view of an environment 220 by displaying display image data 265 depicting the environment 220 on the display(s) 270. The view of the environment 220 that is depicted in the display image data 265 and displayed on the display(s) 270 can be an accurate view of the environment 220 based on the image data 235 captured by the environment-facing sensor(s) 230. The view of the environment 220 that is depicted in the display image data 265 and displayed on the display(s) 270 can be a view of a virtual environment or a mixed environment that is distinct from the environment 220 but that is based on the environment 220, for instance with virtual content 255 incorporated into the environment 220. For instance, the virtual environment or a mixed environment can include virtual objects and/or backgrounds, but that may be mapped to areas and/or volumes of space with dimensions that are based on dimensions of areas and/or volumes of space within the real-world environment that the user and the XR system 200 are in. The XR system 200 can determine the dimensions of areas and/or volumes of space within the environment 220 that the user 205 and the XR system 200 are in based on the image data 235 and/or other sensor captured by the environment-facing sensor(s) 230 of the XR system 200 (e.g., based on the image data 235 of the environment 220 and/or based on depth data of the environment 220). This can ensure that, while the user explores the virtual environment or mixed environment depicted in the display image data 265 and displayed on the display(s) 270, the user 205 does not accidentally fall down a set of stairs, run into a wall or obstacle, or otherwise have a negative interaction and/or potentially dangerous interaction with the real-world environment.

In some examples, the XR system 200 includes an attribute engine 287 that determines and/or tracks one or more attributes of the user 205 based on sensor data (e.g., based on the image data 215) captured by the user-facing sensor(s) 210. Based on the sensor data (e.g., based on the image data 215) captured by the user-facing sensor(s) 210, attribute engine 287 can determine eye position(s) of the eye(s) of the user 205, track eye position(s) of the eye(s) of the user 205, track eye movement(s) of the eye(s) of the user 205, track pupil dilation(s) of the eye(s) of the user 205, track saccade(s) of the eye(s) of the user 205, track fixation(s) by the eye(s) of the user 205, track blinking by the eyelid(s) of the user 205, track squinting by the eyelid(s) of the user 205, track optokinetic reflex(es) by the eye(s) of the user 205, track vestibulo-ocular reflex(es) by the eye(s) of the user 205, track accommodation reflex(es) by the eye(s) of the user 205, track facial expressions of the user 205, track gestures by the user 205, or combinations thereof. Tracking, in the operations listed above, can refer to tracking of timing, frequency, extent, amplitude, eye position, eye movement, or a combination thereof. In some examples, the XR system 200 outputs the image data 215, for instance by displaying the image data 215 via the display(s) 270 and/or by transmitting the image data 215 to a recipient device via a communication transceiver (e.g., communication interface 1040).

FIG. 2B is a block diagram illustrating an example architecture of an extended reality (XR) system 290 that generates image capture settings 295 for user-facing sensor(s) 210 (which can provide image data 292) based on information associated with the user-facing sensor(s) 210. The XR system 290 is a variant of the XR system 200 where the image capture settings engine 280 only receives and/or uses prior capture information associated with the user-facing sensor(s) 210 and/or the image capture settings engine 280 to determine image capture settings 295 for the user-facing sensor(s) 210 (e.g., for the image data 292 from the user-facing sensors(s) 210). An example of a process for generation of the image capture setting(s) 295 by the image capture engine 280 of FIG. 2B is illustrated at least in FIG. 3A. In some examples, the image capture settings 295 can be less up-to-date than the image capture settings 285 at least as discussed with respect to FIGS. 3A and 3B.

FIG. 3A is a block diagram illustrating an example extended reality (XR) process 300 that generates image capture settings 330 for user-facing sensor(s) 310 based on information associated with the user-facing sensor(s) 310. The XR process 300 of FIG. 3A may be performed by the XR system 290 of FIG. 2B or by the XR system 200 of FIG. 2A. Each operation of the XR process 300 is indicated based on the component(s) that perform the respective operation. Each operation of the XR process 300 includes a notation as to either a time at which the operation is performed or a time delay incurred by performance of the operation. In some examples, each increment of 1 in these time notations can correspond to a duration corresponding to capture of an image frame by the user-facing sensor(s) 310.

At a time N, light 305 from a user (e.g., user 205) travels from the user to one or more user-facing sensor(s) 310. The light 305 can be an example of the light 207 from the user 205. The user-facing sensor(s) 310 can be examples of the user-facing sensor(s) 210. At time N+1, the user-facing sensor(s) 310 capture raw image data based on receipt of the light 305 from the user.

An ISP 315 processes the raw image data captured by the user-facing sensor(s) 310 to generate an image. For example, the ISP 315 can perform demosaicking, color space conversion, resampling, pixel interpolation, automatic exposure (AE) control, automatic gain control (AGC), CDAF, PDAF, automatic white balance, merging of images to form an HDR image, or a combination thereof. The ISP 315 can be an example of the ISP 154. The processing performed by the ISP 315 can take some time, indicated in FIGS. 3A and 3B by a delay of 1.

At time N+2, the image generated by the ISP 315 is received by the image capture settings engine 320, and/or the image capture settings engine 320 generates the image capture settings 330. The image capture settings engine 320 can be an example of the image capture settings engine 280. The image capture settings engine 320 generates image capture setting(s) 330 based on the image from the ISP 315. The image capture setting(s) 330 are applied at the user-facing sensor(s) 310 to capture further image data at time N+3. Thus, using the XR process 300 of FIG. 3A, it takes three frames of time from the light 305 from the user traveling to the user-facing sensor(s) 310 to application of image capture setting(s) 330 based on that light 305 at the user-facing sensor(s) 310.

FIG. 3B is a block diagram illustrating an example extended reality (XR) process 350 that generates image capture settings 380 for user-facing sensor(s) 310 based on information associated with a display buffer 355, information associated with environment-facing sensor(s) 365, and/or information associated with the user-facing sensor(s) 310. The XR process 350 of FIG. 3B may be performed by the XR system 200 of FIG. 2A. Each operation of the XR process 350 is indicated based on the component(s) that perform the respective operation. Each operation of the XR process 350 includes a notation as to either a time at which the operation is performed or a time delay incurred by performance of the operation. In some examples, each increment of 1 in these time notations can correspond to a duration corresponding to capture of an image frame by the user-facing sensor(s) 310 and/or to capture of an image frame by the environment-facing sensor(s) 365.

The XR process 350 includes the components and operations of the XR process 300, and also includes additional components and operations. For instance, the XR process 350 includes the light 305 from the user traveling to the user-facing sensor(s) 310 at time N, the user-facing sensor(s) 310 capturing raw image data based on the light 305 at time N+1, and the ISP 315 generating an image by processing the raw image data for a delay of 1. The XR process 350 includes the image capture settings engine 320 receiving the image from the ISP 315. However, the image capture settings engine 320 of FIG. 3B also receives additional data, and can generate the image capture setting(s) 380 of FIG. 3B based on the image and/or the additional data. The image capture settings engine 320 of FIG. 3B can generate the image capture setting(s) 380 based on at least the image from the ISP 315 at time N+2 as in FIG. 3A, and can apply the image capture setting(s) 380 to a new image capture by the user-facing sensor(s) 310 at time N+3 as in FIG. 3A.

The XR process 350 also includes a display buffer 355 that stores display image data at time P. The display image data stored in the display buffer 355 is, in some examples, configured to be displayed on display(s) that face the user. The display buffer 355 can be an example of the display buffer 260. The display image data of FIG. 3B can be an example of the display image data 265. The display image data of FIG. 3B can be an example of the display image data 265. The display(s) of FIG. 3B can be examples of the display(s) 270. At time P, the image capture settings engine 320 of FIG. 3B can receive the display image data stored in the display buffer 355. The image capture settings engine 320 of FIG. 3B can generate the image capture setting(s) 380 based on at least the display image data from the display buffer 355 at time P, and can apply the image capture setting(s) 380 to a new image capture by the user-facing sensor(s) 310 at time P+1.

The XR process 350 also includes light 370 from an environment (e.g., environment 220) that, at time M, travels from the environment to one or more environment-facing sensor(s) 365. The light 370 can be an example of the light 222 from the environment 220. The environment-facing sensor(s) 365 can be examples of the environment-facing sensor(s) 230. At time M+1, the environment-facing sensor(s) 365 capture raw image data based on receipt of the light 370 from the environment. An ISP 360 processes the raw image data captured by the environment-facing sensor(s) 365 to generate an image. For example, the ISP 360 can perform demosaicking, color space conversion, resampling, pixel interpolation, AE control, AGC, CDAF, PDAF, automatic white balance, merging of images to form an HDR image, or a combination thereof. The ISP 360 can be an example of the ISP 154. The ISP 360 and the ISP 315 can be a single ISP or separate ISPs. The processing performed by the ISP 360 can take some time, indicated in FIG. 3B by a delay of 1. At time M+2, the image generated by the ISP 360 can be received by the image capture settings engine 320, and/or the image capture settings engine 320 can generate the image capture settings 380 based on the image generated by the ISP 360. At time M+1, image capture settings that the environment-facing sensor(s) 365 apply in capturing the image based on the light 370 from the environment can be received by the image capture settings engine 320, and/or the image capture settings engine 320 can generate the image capture settings 330 based on the image capture settings for the environment-facing sensor(s) 365. The image capture settings engine 320 can apply image capture setting(s) 380 based on the image generated by the ISP 360 at time M+3. The image capture settings engine 320 can apply image capture setting(s) 380 based on the image capture setting(s) of the environment-facing sensor(s) 365 at time M+2.

The image capture settings engine 320 can generate the image capture setting(s) 380 based on the prior image capture setting(s) for the user-facing sensor(s) 310, the image generated by the ISP 315, the display image data from the display buffer 355, the image capture setting(s) for the environment-facing sensor(s) 365, the image generated by the ISP 360, or a combination thereof. In some examples, the image capture settings engine 320 generates the image capture setting(s) 380 by modifying prior image capture setting(s) for the user-facing sensor(s) 310 based on the image generated by the ISP 315, the display image data from the display buffer 355, the image capture setting(s) for the environment-facing sensor(s) 365, the image generated by the ISP 360, or a combination thereof. In some examples, the image capture setting(s) 380 generated by the image capture settings engine 320 can be more responsive to certain changes in illumination of the user than others. For instance, the image capture setting(s) 380 generated by the image capture settings engine 320 can be more responsive to changes in the display image data from the display buffer 355 (e.g., since corresponding image capture setting(s) 380 can be applied at time P+1) than to changes in the image generated by the ISP 315 or in the in the image generated by the ISP 360.

Use of the display buffer data from the display buffer 355 as a basis for the determination of the image capture setting(s) 380 can speed up determination of image capture setting(s) 380 and allow the image capture setting(s) 380 to be determined and/or used contemporaneously with display of the display buffer data by the display, or within a short delay (e.g., less than the delay for the prior capture information) after display of the display buffer data by the display. Use of the image capture setting(s) from the environment-facing sensor(s) 365 as a basis for the determination of the image capture setting(s) 380 can speed up determination of image capture setting(s) 380 and allow the image capture setting(s) 380, since no image capture by the environment-facing sensor(s) 365 or processing by the ISP 360 are required. Use of the image generated by the ISP 360 as a basis for the determination of the image capture setting can speed up determination of image capture setting(s) 380 and allow the image capture setting(s) 380 to be determined and/or used based on detecting changes to levels of light in the environment before the levels of illumination of the user's face change. For instance, if a user is approaching a region of the environment with different lighting than the region that the user was in previously, this difference in lighting may be detectable using the image generated by the ISP 360 before the corresponding difference in user illumination is detectable using image data to be captured by the user-facing sensor(s) 310 and generated by the ISP 135.

In some examples, the environment-facing sensor(s) 365 and the user-facing sensor(s) 310 may capture sensor data (e.g., image data) at the same frame rate. In some examples, the environment-facing sensor(s) 365 and the user-facing sensor(s) 310 may capture sensor data (e.g., image data) at different respective frame rates. In some examples, the environment-facing sensor(s) 365 capture their image data at a first frame rate, while the user-facing sensor(s) 310 capture their image data at a second frame rate. In some examples, the first frame rate may be faster than the second frame rate, for instance because the environment-facing sensor(s) 365 may also be used for hand-tracking, which can be very important for many XR applications. In such cases, time M+2 and time M+3 may each correspond to shorter periods of time than time N+3, since the frames in times M+2 and M+3 are shorter than the frames for time N+3.

The XR process 350 thus reduces delays and latencies in adjusting image capture setting(s) of the second sensor in response to changes in lighting conditions in the environment and/or due to changes in light patterns emitted by the display compared to the XR process 300. The XR process 350 thus makes the XR system more efficient, adaptive, and responsive in generating and/or adjusting image capture setting(s) 380 for the user-facing sensor(s) 310 in response to changes in lighting conditions in the environment and/or due to changes in light patterns emitted by the display compared to the XR process 300. The XR process 350 can thus reduce or eliminate instances where the user-facing sensor(s) 310 and/or ISP 315 capture and/or generate image data with inappropriate image capture setting(s), which may result in images that are overexposed or underexposed, for example. The XR process 350 can thus, in turn, can improve the quality of the XR system's ability to track eye positions, eye movements, facial expressions, gestures, and the like.

FIG. 4 is a table 400 illustrating examples of information associated with environment-facing sensor(s) 410 and corresponding information associated with user-facing sensor(s) 415. The table 400 includes parameters 405 corresponding to both the environment-facing sensor(s) 410 and the user-facing sensor(s) 415. The parameters 405 include an image characteristic, such as a measure of pixel luminance 420 (e.g., an average pixel luminance or other measure of luminance). Using average pixel luminance as an illustrative example of a measure of pixel luminance 420, according to the table 400, when the measure of pixel luminance 420 for images captured by the environment-facing sensor(s) 410 is 50, the measure of pixel luminance 420 for corresponding images captured by the user-facing sensor(s) 415 is 60. In some examples, the measure of pixel luminance 420 (e.g., average pixel luminance or other measure of luminance) can be referred to as average pixel brightness or an average pixel luma. Average pixel luminance will be used herein as an illustrative example of the measure of pixel luminance 420 (and will be referred to as average pixel luminance 420). Other measures of pixel luminance can be used, such as a weighted average, standard deviation, variance, any combination thereof, and/or other measure of pixel luminance. The parameters 405 further include an image capture setting for exposure time 425. According to the table 400, when the exposure time 425 for image capture by the environment-facing sensor(s) 410 is 20 ms, the exposure time 425 for corresponding image capture by the user-facing sensor(s) 415 is 30 ms. The parameters 405 further include an image capture setting for gain 430. According to the table 400, when the gain 430 for image capture by the environment-facing sensor(s) 410 is 2, the gain 430 for corresponding image capture by the user-facing sensor(s) 415 is 4.

The values in the table 400 can be determined using an extrinsic sensor calibration process. During the static calibration process, the environment-facing sensor(s) 410 and the user-facing sensor(s) 415 can both be focused on respective predetermined calibration patterns with uniform lighting. Automatic exposure (AE) control convergence and/or automatic gain control (AGC) convergence can be used to automatically determine exposure time 425 and/or gain 430 for the environment-facing sensor(s) 410 and the user-facing sensor(s) 415, examples of which are in the table 400. The average pixel luminance 420 for the environment-facing sensor(s) 410 can be computed from one or more images captured by the environment-facing sensor(s) 410. The average pixel luminance 420 for the user-facing sensor(s) 415 can be computed from one or more images captured by the user-facing sensor(s) 415.

Mapping factor(s) between image capture setting values in the corresponding to the environment-facing sensor(s) 410 and image capture setting values corresponding to the user-facing sensor(s) 415 can be determined using the extrinsic sensor calibration process. The mapping factor for a parameter 405 can be computed using ratios of the respective value for that parameter 405 for the environment-facing sensor(s) 410 and the respective value for that parameter 405 for the user-facing sensor(s) 415. In some examples, a mapping factor may be a product of ratios.

In an illustrative example, the mapping factor for a combined exposure and gain parameter can be computed as: $ratio_{EG} * ratio_P$, where $ratio_{EG}$=(exposure time multiplied by gain for user-facing sensors)/(exposure time multiplied by gain for environment-facing sensors), and where $ratio_P$=(average pixel luminance for environment-facing sensors)/(average pixel luminance for user-facing sensors). Using the values in the table 400, the mapping factor for the combined exposure and gain parameter is $((30\times4)/(20\times2))\times(50/60)$= 2.5. To determine an appropriate exposure and gain parameter value for the user-facing sensors 415, an XR system can multiply the corresponding exposure and gain parameter value for the environment-facing sensors 410 by the mapping factor (e.g., 2.5).

Figure 5:
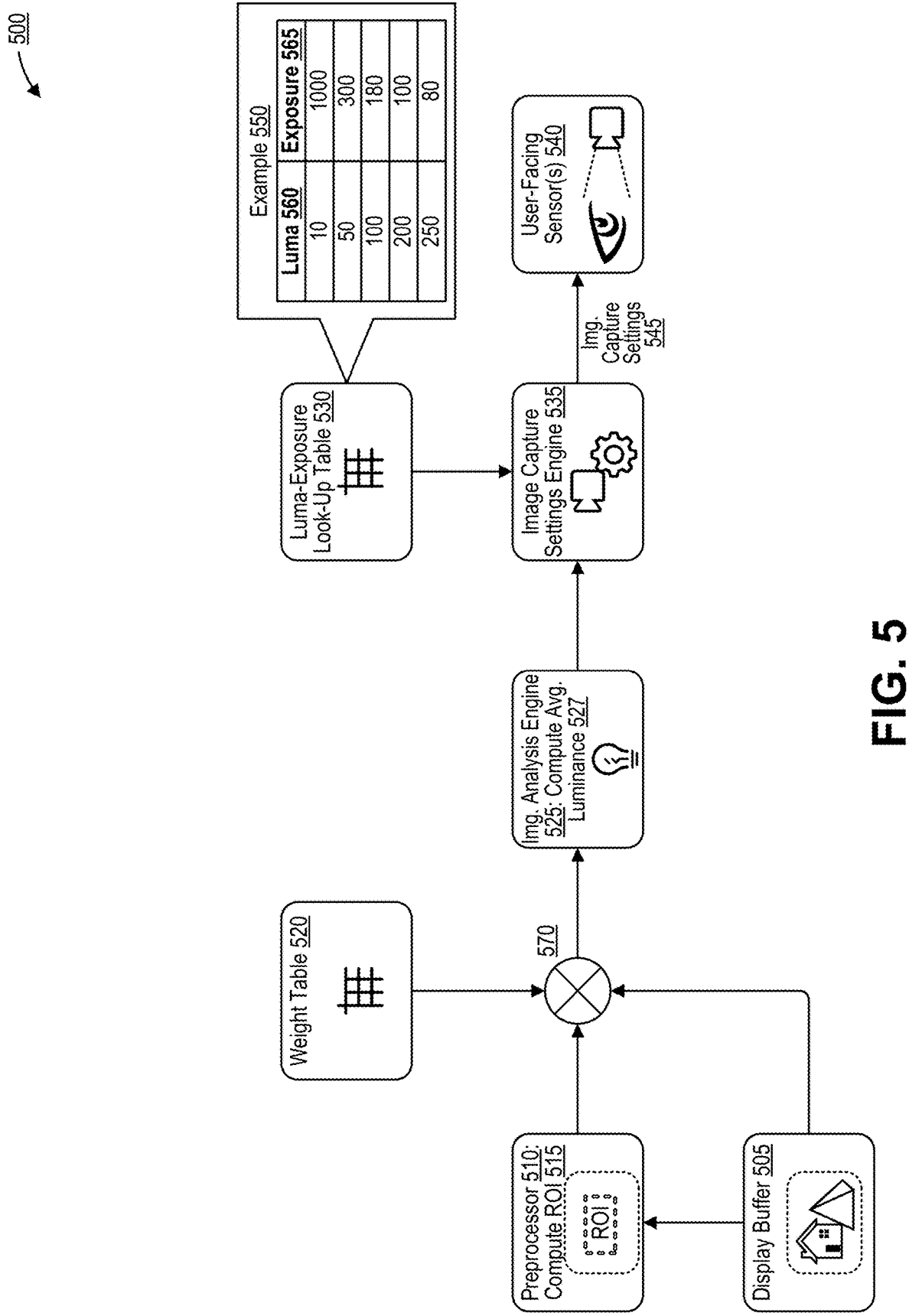
FIG. 5 is a block diagram illustrating an example extended reality (XR) process that generates image capture settings for user-facing sensor(s) based on information associated with the display buffer, in accordance with some examples.

FIG. 5 is a block diagram illustrating an example extended reality (XR) process 500 that generates image capture settings for user-facing sensor(s) 540 based on information associated with the display buffer 505. The XR system of FIG. 5 includes the display buffer 505. The display buffer 505 can be an example of the display buffer 260. The display buffer 505 stores display image data, such as the display image data 265. The XR system of FIG. 5 includes a preprocessor 510. The preprocessor 510 may receive the display image data from the display buffer 505, and may compute a region of interest (ROI) 515 of the display image data from the display buffer 505. The preprocessor 510 can use an object detection engine to compute the ROI 515, for instance by computing the ROI 515 to include one or more objects detected by the object detection engine. The preprocessor 510 can use a saliency mapping engine to compute the ROI 515, for instance by computing the ROI 515 to include one or more regions having a high saliency in a corresponding saliency map as generated by the saliency mapping engine. In some examples, the preprocessor 510 may compute the ROI 515 to include a center of the display image data. In some examples, the preprocessor 510 may compute the ROI 515 to include at least a portion of a center area of the display image data. In some examples, the preprocessor 510 may be part of an image capture settings engine, such as the image capture settings engine 280 and/or the image capture settings engine 320. Within FIG. 5, an example ROI 515 in the center of a rounded rectangle representing the display image data is illustrated in the block corresponding to the preprocessor 510.

The object detection engine can include a feature detection algorithm, a feature extraction algorithm, a feature recognition algorithm, a feature tracking algorithm, an object detection algorithm, an object recognition algorithm, an object tracking algorithm, a facial detection algorithm, a facial recognition algorithm, a facial tracking algorithm, a person detection algorithm, a person recognition algorithm, a person tracking algorithm, a vehicle detection algorithm, a vehicle recognition algorithm, a vehicle tracking algorithm, a classifier, or a combination thereof. The object detection engine can include one or more artificial intelligence (AI) algorithms and/or trained machine learning (ML) models. For example, the object detection engine can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

The saliency mapping engine can include a static saliency algorithm, a motion saliency algorithm, a objectness saliency algorithm, a machine learning based saliency algorithm, or a combination thereof. The saliency mapping engine can include one or more artificial intelligence (AI) algorithms and/or trained machine learning (ML) models. For example, the saliency mapping engine can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

The XR system of FIG. 5 includes a weight table 520. The weight table 520 is a two-dimensional table that applies different weights to different pixels of the display image data from the display buffer 505. In some examples, the weight table 520 includes rows along an X-axis (e.g., in a horizontal direction) and columns along a Y-axis (e.g., in a vertical direction). At each intersection of a row and column, the weight table 520 can include a weight value. In some implementations, the weight table 520 has a same resolution or size as the image associated with the display image data. For example, the X-axis of the weight table 520 can have a same dimension or size as an X-axis of the image, and the Y-axis of the weight table 520 can have a same dimension or size as a Y-axis of the image. In some implementations, the weight table 520 has a different resolution or size as the image associated with the display image data. For example, the weight table 520 can have a smaller resolution as compared to the image. In such an example, the weight table 520 can be scaled (e.g., based on exposure data and/or the image size), such as to scale the weight table 520 to have a same size as the image. In some examples, the weight table 520 can provide more importance (e.g., by applying or including a higher weight or weights) to certain regions of the image corresponding to the ROI 515. For instance, the weight table 520 may include its highest weights closest to the center of the weight table 520 and its lowest weights farthest from the center of the weight table 520, with a gradual transition between the highest weights and the lowest weights in between. In one illustrative example, the weight table 520 can be represented using a Gaussian distribution, where the center of the weight table 520 has higher weights. In such an example, the center of the image will be weighted with more importance than other regions of the image. In some examples, the weight table 520 applies weights (e.g., as multipliers and/or offsets) to pixels of the display image data from the display buffer 505 using a weight application element 570 of the XR system of FIG. 5. The weight application element 570 may, for example, include a multiplier. In some examples, the application of the weight table 520 by the weight application element 570 can be used for calibration and/or for metering based on the ROI 515. For instance, in some cases, exposure can be computed using a particular region of an image (e.g., a center region) based on the weight values of the weight table 520. In one example, the region of the image can include a portion of the image within the ROI 515. In such cases, the weight table 520 will provide more importance to the region of the image (e.g., the center of the image) where the weight values are higher.

The XR system of FIG. 5 includes an image analysis engine 525 that computes an average luminance 527 (or other measure of pixel luminance) of image data. In some examples, the image analysis engine 525 that computes the average luminance 527 of an entire display image from the display buffer. In some examples, the image analysis engine 525 that computes the average luminance 527 of the ROI 515 of the display image from the display buffer. In some examples, the average luminance 527 computed by the image analysis engine 525 is a weighted average that is weighted based on the weight table 520 and/or the ROI 515.

The XR system of FIG. 5 includes a luminance-exposure look-up table 530 that maps between luminance and exposure value (e.g., exposure time multiplied by gain). An example 550 of the luminance-exposure look-up table 530 is illustrated in FIG. 5, with a column for luminance 560 and a column for exposure 565. In the example 550 of the luminance-exposure look-up table 530, a luminance of 10 maps to an exposure of 1000, a luminance of 50 maps to an exposure of 300, a luminance of 100 maps to an exposure of 180, a luminance of 200 maps to an exposure of 100, and a luminance of 250 maps to an exposure of 80. The luminance-exposure look-up table 530 may be pre-calibrated before use. For instance, in some examples, the luminance-exposure look-up table 530 is calibrated in a dark environment 220, where the user 205 is illuminated exclusively (or almost exclusively) by the light 275 from the display(s) 270 displaying the display image data from the display buffer 505. Automatic exposure (AE) control convergence and/or automatic gain control (AGC) convergence can be used to automatically determine exposure time and/or gain for the column for exposure 565 of the luminance-exposure look-up table 530.

The XR system of FIG. 5 includes an image capture settings engine 535. The image capture settings engine 535 may be an example of the image capture settings engine 280 and/or the image capture settings engine 320. The image capture settings engine 535 generates the image capture settings 545—which may include an exposure setting, for instance—by finding an exposure value in the column for exposure 565 that matches a luminance value in the column for luminance 560 that most closely matches the average luminance 527 (or other measure of luminance). The image capture settings engine 535 of FIG. 5 applies the image capture settings 545 to the user-facing sensor(s) 540.

In some examples, the image capture settings engine 280, the image capture settings engine 320, and/or the image capture settings engine 535 can include at least one of the preprocessor 510, the weight table 520, the weight application element 570, the image analysis engine 525, and/or the luminance-exposure look-up table 530.

Figure 6:
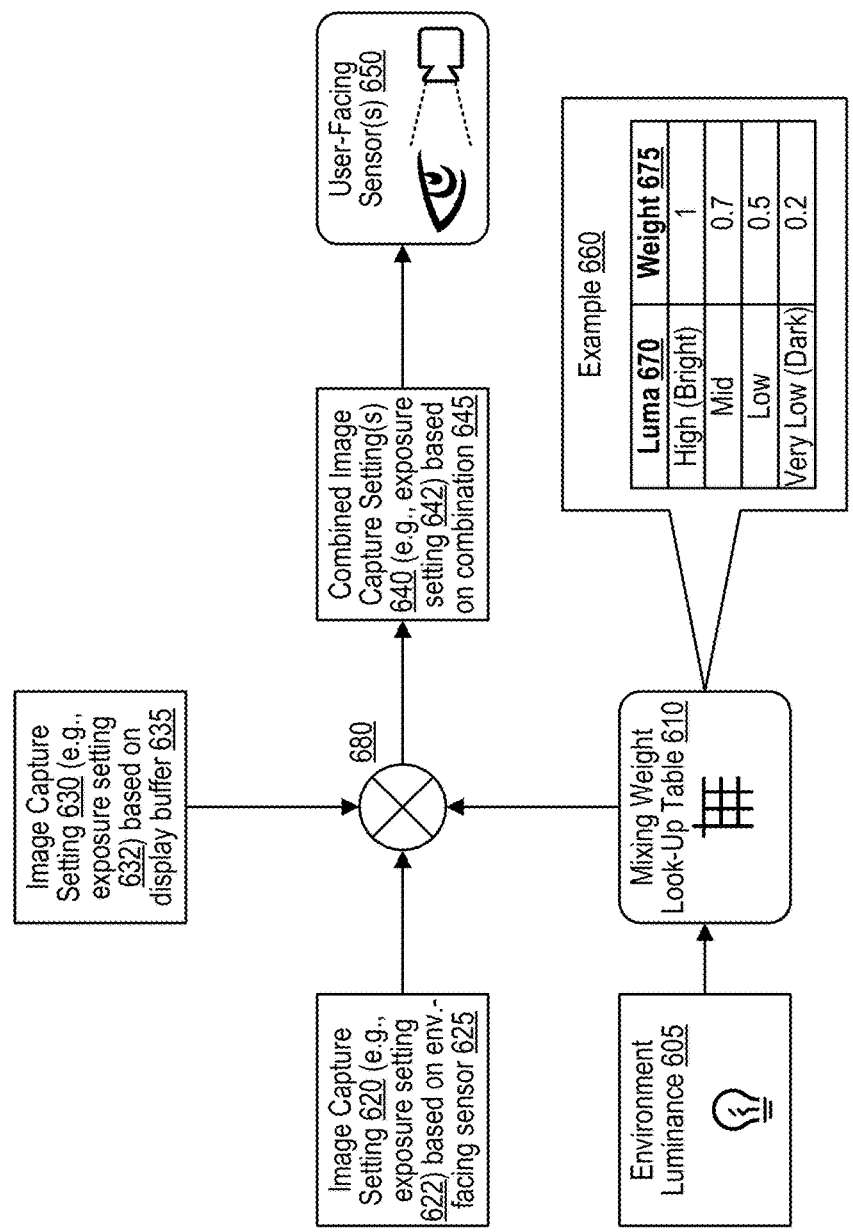
FIG. 6 is a block diagram illustrating an example extended reality (XR) process that generates image capture settings for user-facing sensor(s) by mixing an image capture setting determined based on a display buffer with an image capture setting determined based on one or more environment-facing sensors, in accordance with some examples.

FIG. 6 is a block diagram illustrating an example extended reality (XR) process 600 that generates combined image capture setting(s) 640 for user-facing sensor(s) 650 by mixing an image capture setting 630 determined based on a display buffer 635 with an image capture setting 620 determined based on one or more environment-facing sensors 625 (shown in FIG. 6 as combination 645).

For instance, the XR system of FIG. 6 may determine the image capture setting 630 based on the display buffer 635 using one or more of the processes described with respect to at least one of FIG. 2A, 3B, or 5. The image capture setting 630 based on the display buffer 635 may include an exposure setting 632. The XR system of FIG. 6 may determine the image capture setting 620 based on the environment-facing sensor(s) 625 using one or more of the processes described with respect to at least one of FIG. 2A or 3B, and/or the table 400 of FIG. 4. The image capture setting 620 based on the environment-facing sensor(s) 625 may include an exposure setting 622.

The XR system of FIG. 6 determines an environment luminance 605 of an environment (e.g., environment 220), for instance based on image data (e.g., image data 235) from environment-facing sensor(s) (e.g., environment-facing sensor(s) 230) and/or from one or more ambient light sensors (ALSs). For example, an ALS can be used to detect ambient light and to control the display brightness and/or exposure based on the detected ambient light (e.g., increasing exposure when ambient light is less than a light threshold and decreasing exposure when ambient light is greater than a light threshold). In one illustrative example, the light threshold can include an illuminance value (e.g., in lux units) of 50 (e.g., 50 lux), but can include any other suitable value (e.g., 49 lux, 40 lux, 30 lux, 20 lux, etc.). The environment luminance 605 may be a measure of luminance or pixel luminance, such as an average luminance, an average brightness, an average luma, any combination thereof, and/or other measure of luminance. The environment luminance 605 may be a measure of luminance or pixel luminance, such as a weighted average luminance, a weighted average brightness, a weighted average luma, any combination thereof, and/or other measure of luminance.

The XR system of FIG. 6 includes a mixing weight look-up table 610. An example 660 of the mixing weight look-up table 610 is illustrated in FIG. 6, and includes a column for luminance 670 and a column for weight 675. For instance, in the example 660 of the mixing weight look-up table 610 that is illustrated in FIG. 6, a high (bright) luminance corresponds to a weight of 1, a medium (mid) luminance corresponds to a weight of 0.7, a low luminance corresponds to a weight of 0.5, and a very low (dark) luminance corresponds to a weight of 0.2.

The XR system of FIG. 6 includes a mixer 680. The mixer 680 generates the combined image capture settings 640—which may include an exposure setting 642, for instance—by mixing the image capture setting 630 (that is based on the display buffer 635) and the image capture setting 620 (that is based on the environment-facing sensor(s) 625) according to a mixing weight from the mixing weight look-up table 610. The XR system of FIG. 6 selects the mixing weight from the mixing weight look-up table 610 by select a weight value in the column for weight 675 that matches a luminance value in the column for luminance 670 that most closely matches the environment luminance 605. The image capture settings engine 535 of FIG. 5 applies the combined image capture settings 640 to the user-facing sensor(s) 650.

Figure 7A:
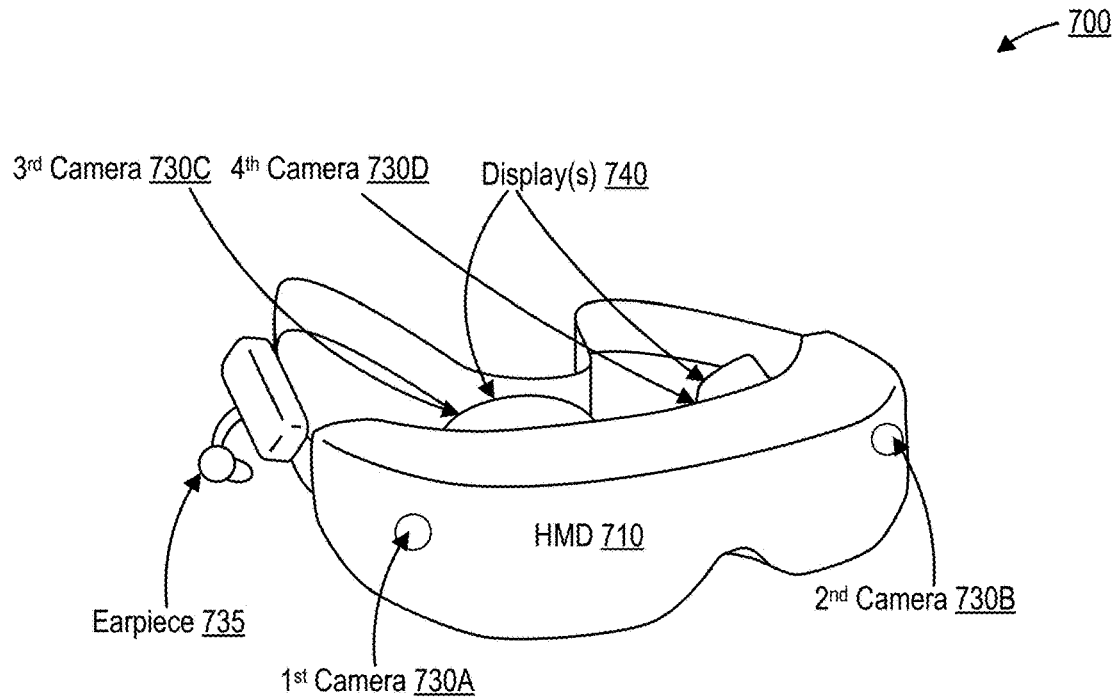
FIG. 7A is a perspective diagram illustrating a head-mounted display (HMD) that is used as an extended reality (XR) system, in accordance with some examples.

FIG. 7A is a perspective diagram 700 illustrating a head-mounted display (HMD) 710 that is used as an extended reality (XR) system 200. The IMD 710 may be, for example, an augmented reality (AR) headset, a virtual reality (VR) headset, a mixed reality (MR) headset, an extended reality (XR) headset, or some combination thereof. The HMD 710 may be an example of an XR system 200. The HMD 710 may perform the XR process 300, the XR process 350, the XR process 500, the XR process 600, and/or the process 900. The HMD 710 includes a first camera 730A and a second camera 730B along a front portion of the HMD 710. The first camera 730A and the second camera 730B may be examples of the environment-facing sensors 230 of the XR system 200, the environment-facing sensor(s) 365, the environment-facing sensor(s) 410, the environment-facing sensor(s) 625, the first camera of operation 905, the first image sensor of operation 905, or a combination thereof. The HMD 710 includes a third camera 730C and a fourth camera 730D facing the eye(s) of the user of the HMD 710 as the eye(s) of the user face the display(s) 740. The user of the HMD 710 may be an example of the user 205. The third camera 730C and the fourth camera 730D may be examples of the user-facing sensors 210 of the XR system 200, the user-facing sensors 210 of the XR system 290, the user-facing sensor(s) 310, the user-facing sensor(s) 415, the user-facing sensor(s) 540 of the XR process 500, the user-facing sensor(s) 650 of the XR process 600, the second camera of operations 910 and 915, the second image sensor of operations 910 and 915, or a combination thereof. In some examples, the HMD 710 may only have a single camera with a single image sensor. In some examples, the HMD 710 may include one or more additional cameras in addition to the first camera 730A, the second camera 730B, third camera 730C, and the fourth camera 730D. In some examples, the HMD 710 may include one or more additional sensors in addition to the first camera 730A, the second camera 730B, third camera 730C, and the fourth camera 730D, which may also include other types of user-facing sensors 210 and/or environment-facing sensors 230 of the XR system 200. In some examples, the first camera 730A, the second camera 730B, third camera 730C, and/or the fourth camera 730D may be examples of the image capture and processing system 100, the image capture device 105A, the image processing device 105B, or a combination thereof.

The HMD 710 may include one or more displays 740 that are visible to a user 720 wearing the HMD 710 on or around at least a portion of the user 720's head. The one or more displays 740 of the HMD 710 can be examples of the one or more displays 270 of the XR system 200. In some examples, the HMD 710 may include one display 740 and two viewfinders. The two viewfinders can include a left viewfinder for the user 720's left eye and a right viewfinder for the user 720's right eye. The left viewfinder can be oriented so that the left eye of the user 720 sees a left side of the display. The right viewfinder can be oriented so that the left eye of the user 720 sees a right side of the display. In some examples, the HMD 710 may include two displays 740, including a left display that displays content to the user 720's left eye and a right display that displays content to a user 720's right eye. The one or more displays 740 of the HMD 710 can be pass-through displays or see-through displays. The one or more displays 740 of the HMD 710 can display display images from a display buffer, such as the display buffer 260, the display buffer 355, the display buffer 505, the display buffer 635, or a combination thereof.

Figure 7B:
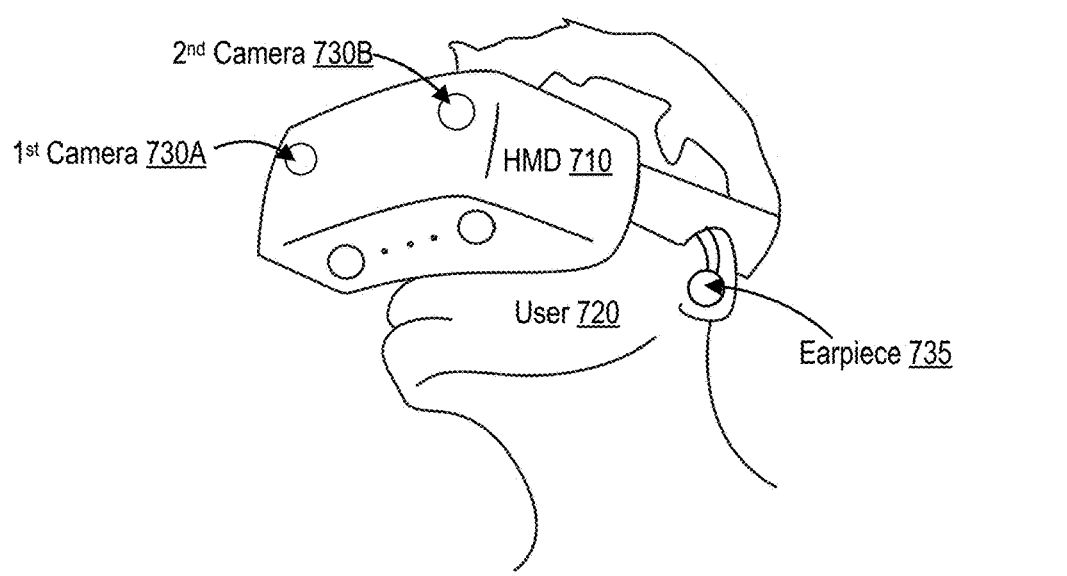
FIG. 7B is a perspective diagram illustrating the head-mounted display (HMD) of FIG. 3A being worn by a user, in accordance with some examples.

The HMD 710 may include one or more earpieces 735, which may function as speakers and/or headphones that output audio to one or more ears of a user of the HMD 710. One earpiece 735 is illustrated in FIGS. 7A and 7B, but it should be understood that the HMD 710 can include two earpieces, with one earpiece for each ear (left ear and right ear) of the user. In some examples, the HMD 710 can also include one or more microphones (not pictured). The one or more microphones can be examples of the user-facing sensors 210 and/or environment-facing sensors 230 of the XR system 200, for instance depending on whether the microphones are facing the user 205 or the environment 220. In some examples, the audio output by the HMD 710 to the user through the one or more earpieces 735 may include, or be based on, audio recorded using the one or more microphones.

FIG. 7B is a perspective diagram 750 illustrating the head-mounted display (HMD) of FIG. 7A being worn by a user 720. The user 720 wears the HMD 710 on or around the user 720's head over the user 720's eyes. The user 720 of the HMD 710 may be an example of the user 205. The HMD 710 can capture images with the first camera 730A and the second camera 730B. In some examples, the HMD 710 displays one or more display images toward the user 720's eyes using the display(s) 740. In some examples, the display images can include display image data from a display buffer, such as the display image data 265 from the display buffer 260, display image data from the display buffer 355, display image data from the display buffer 505, display image data from the display buffer 635, or a combination thereof. The display images can be based on the images (e.g., image data 235) captured by the first camera 730A and the second camera 730B, for example with the virtual content (e.g., virtual content 755) overlaid (e.g., using the compositor 240). The display images may provide a stereoscopic view of the environment 220, in some cases with the virtual content overlaid and/or with other modifications. For example, the HMD 710 can display a first display image to the user 720's right eye, the first display image based on an image captured by the first camera 730A. The HMD 710 can display a second display image to the user 720's left eye, the second display image based on an image captured by the second camera 730B. For instance, the HMD 710 may provide overlaid virtual content (e.g. virtual content 255) in the display images overlaid over the images (e.g., image data 235) captured by the first camera 730A and the second camera 730B. The third camera 730C and the fourth camera 730D can capture images (e.g., image data 215) of the eyes of the before, during, and/or after the user views the display images displayed by the display(s) 740. This way, the sensor data from the third camera 730C and/or the fourth camera 730D (e.g., image data 215) can capture reactions to the display image data by the user's eyes (and/or other portions of the user). An earpiece 735 of the HMD 710 is illustrated in an ear of the user 720. The HMD 710 may be outputting audio to the user 720 through the earpiece 735 and/or through another earpiece (not pictured) of the HMD 710 that is in the other ear (not pictured) of the user 720.

Figure 8A:
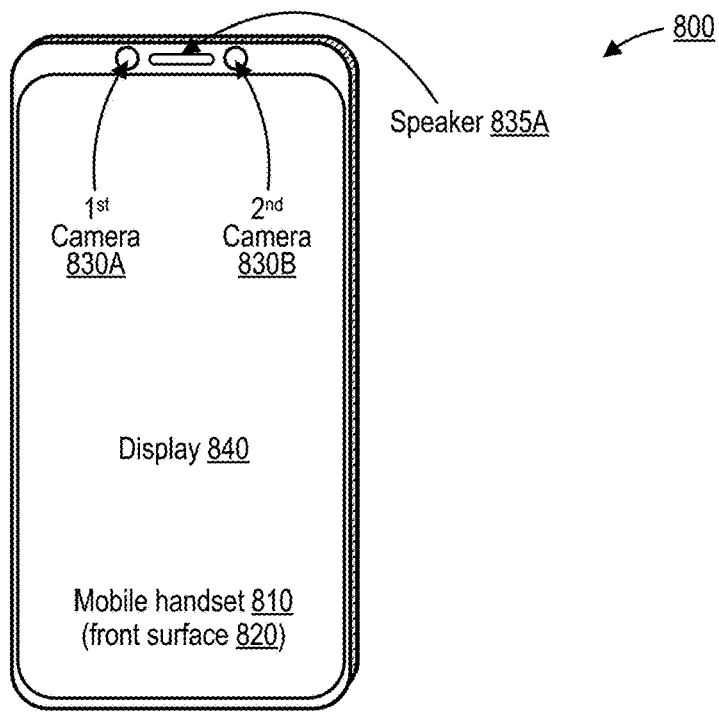
FIG. 8A is a perspective diagram illustrating a front surface of a mobile handset that includes front-facing cameras and that can be used as an extended reality (XR) system, in accordance with some examples.

FIG. 8A is a perspective diagram 800 illustrating a front surface of a mobile handset 810 that includes front-facing cameras and can be used as an extended reality (XR) system 200. The mobile handset 810 may be an example of a XR system 200. The mobile handset 810 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 820 of the mobile handset 810 includes a display 840. The front surface 820 of the mobile handset 810 includes a first camera 830A and a second camera 830B. The first camera 830A and the second camera 830B may be examples of the user-facing sensors 210 of the XR system 200, the user-facing sensors 210 of the XR system 290, the user-facing sensor(s) 310, the user-facing sensor(s) 415, the user-facing sensor(s) 540 of the XR process 500, the user-facing sensor(s) 650 of the XR process 600, the second camera of operations 910 and 915, the second image sensor of operations 910 and 915, or a combination thereof. The first camera 830A and the second camera 830B can face the user, including the eye(s) of the user, while content (e.g., the virtual content overlaid over the environment) is displayed on the display 840. The user of the mobile handset 810 can be an example of the user 205. The display 840 can be an example of the display(s) 270 of the XR system 200.

The first camera 830A and the second camera 830B are illustrated in a bezel around the display 840 on the front surface 820 of the mobile handset 810. In some examples, the first camera 830A and the second camera 830B can be positioned in a notch or cutout that is cut out from the display 840 on the front surface 820 of the mobile handset 810. In some examples, the first camera 830A and the second camera 830B can be under-display cameras that are positioned between the display 840 and the rest of the mobile handset 810, so that light passes through a portion of the display 840 before reaching the first camera 830A and the second camera 830B. The first camera 830A and the second camera 830B of the perspective diagram 800 are front-facing cameras. The first camera 830A and the second camera 830B face a direction perpendicular to a planar surface of the front surface 820 of the mobile handset 810. The first camera 830A and the second camera 830B may be two of the one or more cameras of the mobile handset 810. The first camera 830A and the second camera 830B may be the sensor 805A and the sensor 805B, respectively. In some examples, the front surface 820 of the mobile handset 810 may only have a single camera.

In some examples, the front surface 820 of the mobile handset 810 may include one or more additional cameras in addition to the first camera 830A and the second camera 830B. The one or more additional cameras may also be examples of the user-facing sensors 210 of the XR system 200, the user-facing sensors 210 of the XR system 290, the user-facing sensor(s) 310, the user-facing sensor(s) 415, the user-facing sensor(s) 540 of the XR process 500, the user-facing sensor(s) 650 of the XR process 600, the second camera of operations 910 and 915, the second image sensor of operations 910 and 915, or a combination thereof. In some examples, the front surface 820 of the mobile handset 810 may include one or more additional sensors in addition to the first camera 830A and the second camera 830B. The one or more additional sensors may also be examples of the user-facing sensors 210 of the XR system 200, the user-facing sensors 210 of the XR system 290, the user-facing sensor(s) 310, the user-facing sensor(s) 415, the user-facing sensor(s) 540 of the XR process 500, the user-facing sensor(s) 650 of the XR process 600, the second camera of operations 910 and 915, the second image sensor of operations 910 and 915, or a combination thereof. In some cases, the front surface 820 of the mobile handset 810 includes more than one display 840. The one or more displays 840 of the front surface 820 of the mobile handset 810 can be examples of the display(s) 270 of the XR system 200. For example, the one or more displays 840 can include one or more touchscreen displays. The one or more displays 840 of the mobile handset 810 can display display image data from a display buffer, such as the display image data 265 from the display buffer 260, display image data from the display buffer 355, display image data from the display buffer 505, display image data from the display buffer 635, or a combination thereof.

The mobile handset 810 may include one or more speakers 835A and/or other audio output devices (e.g., earphones or headphones or connectors thereto), which can output audio to one or more ears of a user of the mobile handset 810. One speaker 835A is illustrated in FIG. 8A, but it should be understood that the mobile handset 810 can include more than one speaker and/or other audio device. In some examples, the mobile handset 810 can also include one or more microphones (not pictured). The one or more microphones can be examples of the user-facing sensors 210 and/or of the environment-facing sensors 230 of the XR system 200. In some examples, the mobile handset 810 can include one or more microphones along and/or adjacent to the front surface 820 of the mobile handset 810, with these microphones being examples of the user-facing sensors 210 of the XR system 200, for instance depending on whether the microphones are facing the user 205 or the environment 220. In some examples, the audio output by the mobile handset 810 to the user through the one or more speakers 835A and/or other audio output devices may include, or be based on, audio recorded using the one or more microphones.

Figure 8B:
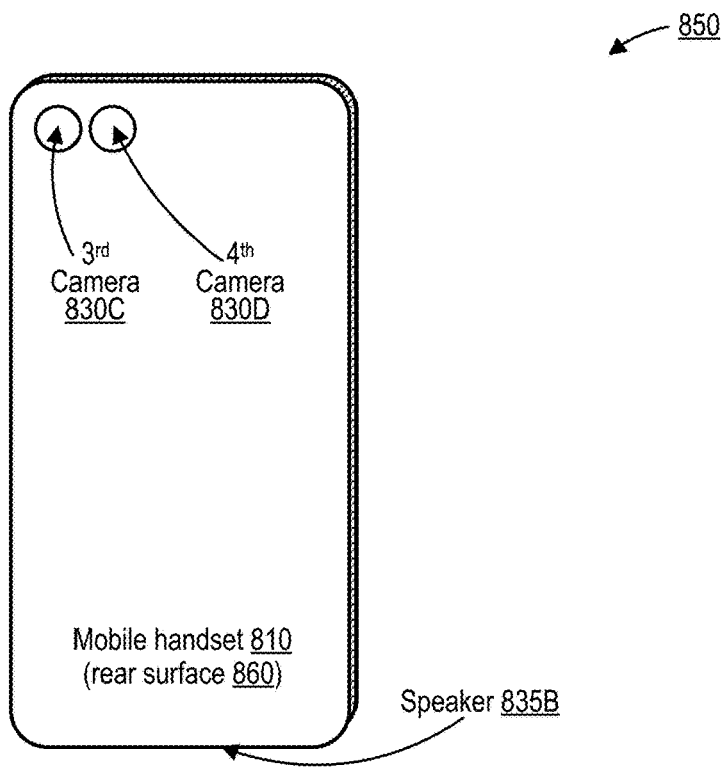
FIG. 8B is a perspective diagram illustrating a rear surface of a mobile handset that includes rear-facing cameras and that can be used as an extended reality (XR) system, in accordance with some examples.

FIG. 8B is a perspective diagram 850 illustrating a rear surface 860 of a mobile handset that includes rear-facing cameras and that can be used as an extended reality (XR) system 200. The mobile handset 810 includes a third camera 830C and a fourth camera 830D on the rear surface 860 of the mobile handset 810. The third camera 830C and the fourth camera 830D of the perspective diagram 850 are rear-facing. The third camera 830C and the fourth camera 830D may be examples of the environment-facing sensors 230 of the XR system 200, the environment-facing sensor(s) 365, the environment-facing sensor(s) 410, the environment-facing sensor(s) 625, the first camera of operation 905, the first image sensor of operation 905, or a combination thereof. The third camera 830C and the fourth camera 830D face a direction perpendicular to a planar surface of the rear surface 860 of the mobile handset 810.

The third camera 830C and the fourth camera 830D may be two of the one or more cameras of the mobile handset 810. In some examples, the rear surface 860 of the mobile handset 810 may only have a single camera. In some examples, the rear surface 860 of the mobile handset 810 may include one or more additional cameras in addition to the third camera 830C and the fourth camera 830D. The one or more additional cameras may also be examples of the environment-facing sensors 230 of the XR system 200, the environment-facing sensor(s) 365, the environment-facing sensor(s) 410, the environment-facing sensor(s) 625, the first camera of operation 905, the first image sensor of operation 905, or a combination thereof. In some examples, the rear surface 860 of the mobile handset 810 may include one or more additional sensors in addition to the third camera 830C and the fourth camera 830D. The one or more additional sensors may also be examples of the environment-facing sensors 230 of the XR system 200, the environment-facing sensor(s) 365, the environment-facing sensor(s) 410, the environment-facing sensor(s) 625, the first camera of operation 905, the first image sensor of operation 905, or a combination thereof. In some examples, the first camera 830A, the second camera 830B, third camera 830C, and/or the fourth camera 830D may be examples of the image capture and processing system 100, the image capture device 105A, the image processing device 105B, or a combination thereof.

The mobile handset 810 may include one or more speakers 835B and/or other audio output devices (e.g., earphones or headphones or connectors thereto), which can output audio to one or more ears of a user of the mobile handset 810. One speaker 835B is illustrated in FIG. 8B, but it should be understood that the mobile handset 810 can include more than one speaker and/or other audio device. In some examples, the mobile handset 810 can also include one or more microphones (not pictured). The one or more microphones can be examples of the user-facing sensors 210 and/or of the environment-facing sensors 230 of the XR system 200, for instance depending on whether the microphones are facing the user 205 or the environment 220. In some examples, the mobile handset 810 can include one or more microphones along and/or adjacent to the rear surface 860 of the mobile handset 810, with these microphones being examples of the environment-facing sensors 230 of the XR system 200. In some examples, the audio output by the mobile handset 810 to the user through the one or more speakers 835B and/or other audio output devices may include, or be based on, audio recorded using the one or more microphones.

The mobile handset 810 may use the display 840 on the front surface 820 as a pass-through display. For instance, the display 840 may display display image data, such as the display image data 265 from the display buffer 260. The display image data can be based on the images captured by the third camera 830C and/or the fourth camera 830D (e.g., image data 235), for example with the virtual content overlaid. The first camera 830A and/or the second camera 830B can capture images (e.g., image data 215) of the user's eyes (and/or other portions of the user) before, during, and/or after the display of the display image data on the display 840. This way, the sensor data (e.g., image data 215) from the first camera 830A and/or the second camera 830B can capture reactions to the display image data by the user's eyes (and/or other portions of the user).

Figure 9:
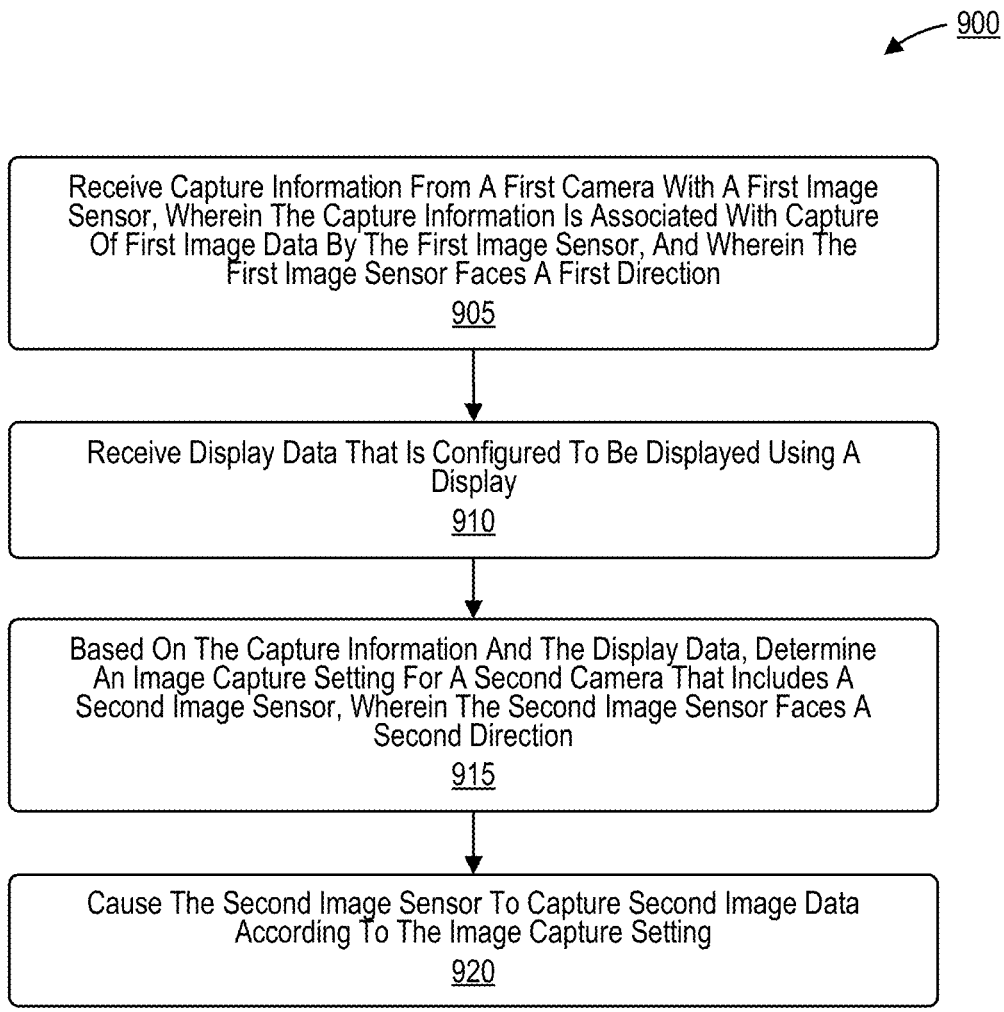
FIG. 9 is a flow diagram illustrating a process for automatic capture setting configuration, in accordance with some examples.

FIG. 9 is a flow diagram illustrating a process 900 for automatic capture setting configuration. The process 900 may be performed by an imaging system. In some examples, the imaging system can include, for example, the image capture and processing system 100, the image capture device 105A, the image processing device 105B, the image processor 150, the ISP 154, the host processor 152, the XR system 200, the XR system 290, the image capture settings engine 280, the user-facing sensor(s) 210, the environment-facing sensor(s) 230, the display buffer 260, the XR system that performs the XR process 300, the XR system that performs the XR process 350, the image capture settings engine 320, the user-facing sensor(s) 310, the environment-facing sensor(s) 365, the display buffer 355, the user-facing sensor(s) 415, the environment-facing sensor(s) 410, the XR system that performs the XR process 500, the user-facing sensor(s) 540, the display buffer 505, the image analysis engine 525, the XR system that performs the XR process 600, the user-facing sensor(s) 650, the environment-facing sensor(s) 625, the display buffer 635, the HMD 710, mobile handset 810, the computing system 1000, the processor 1010, or a combination thereof.

At operation 905, the imaging system can receive capture information from a first camera with a first image sensor. In some aspects, the capture information is associated with capture of first image data by the first image sensor. In some cases, the first image sensor faces a first direction.

At operation 910, the imaging system is can receive display data that is configured to be displayed using a display. In some examples, the imaging system includes the display. In some cases, the display is configured to direct light corresponding to the display data toward the second direction. In some aspects, the display is at least partially transmissive to light passing from the first direction to the second direction. In some examples, the imaging system can receive the display data from a display buffer that stores the display data before the display data is displayed using the display. In some aspects, the display data includes image content captured by the first image sensor. In some examples, the display data includes virtual content. In some cases, the imaging system can generate virtual content that is distinct from content captured by the first image sensor.

At operation 915, the imaging system can determine, based on the capture information and the display data, an image capture setting for a second camera that includes a second image sensor. In some implementations, the imaging system includes the first image sensor and the second image sensor. The second image sensor faces a second direction, which in some cases can be different than the first direction at which the first image sensor faces. For instance, in some cases, the first direction faces toward an environment, and the second direction faces toward at least a portion of a user. In some cases, the first direction is parallel and opposite to the second direction.

In some cases, the capture information includes the first image data. In some aspects, the imaging system can determine a measure of luminance of at least a portion of the first image data. In some examples, to determine the image capture setting for the second camera based on the capture information and the display data, the imaging system can determine the image capture setting for the second camera based on the measure of luminance.

In some cases, the capture information includes a second image capture setting. In some aspects, the first image sensor is configured to capture the first image data according to the second image capture setting. In some examples, the second image capture setting includes an exposure setting. In such examples, the first image sensor can be configured to capture the first image data with an exposure parameter of the first camera according to the exposure setting. In some aspects, to determine the image capture setting for the second camera based on the capture information and the display data, the imaging system can determine the image capture setting for the second camera based on the second image capture setting and a look-up table. In some cases, the look-up table maps respective image capture settings between the first camera and the second camera. In some aspects, the image capture setting corresponds to the second image capture setting in the look-up table.

In some aspects, the imaging system can determine a measure of luminance of at least a portion of the display data. In some cases, to determine the image capture setting for the second camera based on the capture information and the display data, the imaging system can determine the image capture setting for the second camera based on the measure of luminance.

In some examples, the imaging system can receive second image capture information from the second camera. In some cases, the second image capture information is associated with capture of third image data by the second image sensor before capture of the second image data by the second image sensor. In some aspects, to determine the image capture setting for the second camera based on the capture information and the display data, the imaging system can determine the image capture setting for the second camera based on the capture information and the second image capture information and the display data. In some examples, the second image capture information includes the third image data. In some aspects, the imaging system can determine a measure of luminance of at least a portion of the third image data. In some cases, to determine the image capture setting for the second camera based on the capture information and the second image capture information and the display data, the imaging system can determine the image capture setting for the second camera based on the measure of luminance. In some aspects, the second image capture information includes a second image capture setting. In some cases, the second image sensor captures the third image data according to the second image capture setting.

In some aspects, the imaging system can determine a level of illumination of a portion of a user based on the capture information and the display data. In some cases, to determine the image capture setting for the second camera based on the capture information, the imaging system can determine the image capture setting for the second image sensor based on the level of illumination of the portion of the user. In some examples, to determine the level of illumination of the portion of the user, the imaging system can determine the level of illumination of the portion of the user based on the capture information and on second image capture information that is associated with capture of third image data by the second image sensor before capture of the second image data by the second image sensor.

At operation 920, the imaging system can cause the second image sensor to capture second image data according to the image capture setting. In some cases, the first image data includes a depiction of at least a portion of an environment, and the second image data includes a depiction of at least a portion of a user. In some examples, the second image data includes a depiction of one or more eyes of a user. The image capture setting can include any suitable setting, such as an exposure setting, a white balance setting. In some case, the white balance setting can be based on color information (e.g., color cast, color temperature, etc.) asso-ciated with the capture information. For instance, the white balance setting can be based on color cast or color temperature of incoming light and color of virtual content presented by the display.

As noted above, in some examples, the image capture setting includes an exposure setting. In some cases, to cause the second image sensor to capture the second image data according to the image capture setting, the imaging system can set an exposure parameter associated with the second camera according the exposure setting.

In some cases, the imaging system can receive the second image data captured by the second image sensor. In some examples, the imaging system can output the second image data. In some examples, the imaging system can determine a position of an eye of a user based on the second image data.

Figure 10:
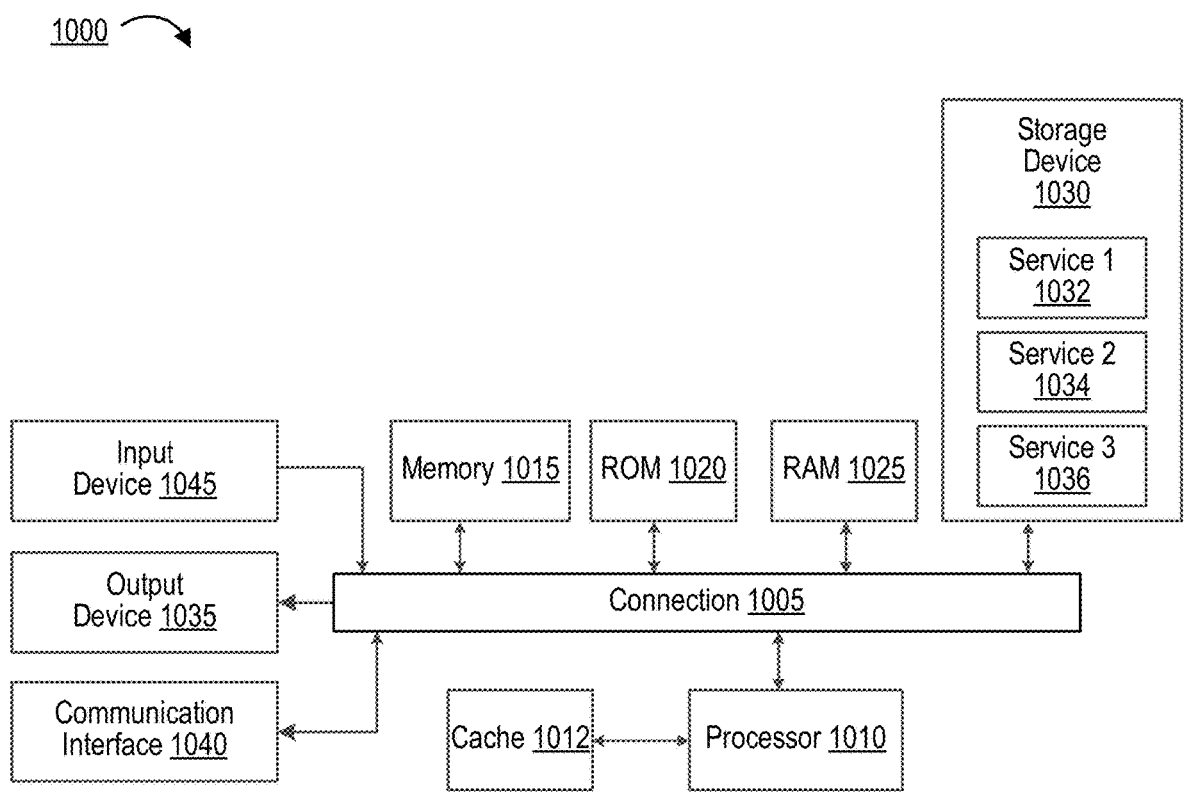
FIG. 10 is a diagram illustrating an example of a computing system for implementing certain aspects described herein.

In some examples, the processes described herein (e.g., the process of FIG. 1, the process(es) performed by the XR system 200 of FIG. 2A, the process(es) performed by the XR system 290 of FIG. 2B, the XR process 300 of FIG. 3A, the XR process 350 of FIG. 3B, the XR process 500 of FIG. 5, the XR process 600 of FIG. 6, the process 900 of FIG. 9, the process(es) performed by the computing system 1000 of FIG. 10, and/or other process described herein) may be performed by a computing device or apparatus. In some examples, the processes described herein can be performed by the image capture and processing system 100, the image capture device 105A, the image processing device 105B, the image processor 150, the ISP 154, the host processor 152, the XR system 200, the XR system 290 the HMD 710, mobile handset 810, the computing system 1000, the processor 1010, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes of FIGS. 1, 2, 8, 9, and/or 10. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for automatic capture setting configuration, the apparatus comprising: at least one memory; and one or more processors coupled to the at least one memory, the one or more processors configured to: receive capture information from a first camera with a first image sensor, wherein the capture information is associated with capture of first image data by the first image sensor, and wherein the first image sensor faces a first direction; receive display data that is configured to be displayed using a display; based on the capture information and the display data, determine an image capture setting for a second camera that includes a second image sensor, wherein the second image sensor faces a second direction; and cause the second image sensor to capture second image data according to the image capture setting.

Aspect 2: The apparatus of Aspect 1, wherein the image capture setting includes an exposure setting, and wherein, to cause the second image sensor to capture the second image data according to the image capture setting, the one or more processors are configured to set an exposure parameter associated with the second camera according the exposure setting.

Aspect 3: The apparatus of any of Aspects 1 to 2, wherein the image capture setting includes a white balance setting that based on color information associated with the capture information.

Aspect 4: The apparatus of any of Aspects 1 to 3, wherein the capture information includes the first image data.

Aspect 5: The apparatus of Aspect 4, wherein the one or more processors are configured to: determine a measure of luminance of at least a portion of the first image data, wherein, to determine the image capture setting for the second camera based on the capture information and the display data, the one or more processors are configured to determine the image capture setting for the second camera based on the measure of luminance.

Aspect 6: The apparatus of any of Aspects 1 to 5, wherein the capture information includes a second image capture setting, and wherein the first image sensor is configured to capture the first image data according to the second image capture setting.

Aspect 7: The apparatus of any of Aspects 1 to 6, wherein the second image capture setting includes an exposure setting, and wherein the first image sensor is configured to capture the first image data with an exposure parameter of the first camera according to the exposure setting.

Aspect 8: The apparatus of any of Aspects 6 or 7, wherein, to determine the image capture setting for the second camera based on the capture information and the display data, the one or more processors are configured to determine the image capture setting for the second camera based on the second image capture setting and a look-up table, the look-up table mapping respective image capture settings between the first camera and the second camera, and wherein the image capture setting corresponds to the second image capture setting in the look-up table.

Aspect 9: The apparatus of any of Aspects 1 to 8, wherein, to receive the display data, the one or more processors are configured to receive the display data from a display buffer that stores the display data before the display data is displayed using the display.

Aspect 10: The apparatus of any of Aspects 1 to 9, wherein the one or more processors are configured to: determine a measure of luminance of at least a portion of the display data, wherein, to determine the image capture setting for the second camera based on the capture information and the display data, the one or more processors are configured to determine the image capture setting for the second camera based on the measure of luminance.

Aspect 11: The apparatus of any of Aspects 1 to 10, further comprising: the display configured to display the display data.

Aspect 12: The apparatus of any of Aspects 1 to 11, wherein the display is configured to direct light corresponding to the display data toward the second direction.

Aspect 13: The apparatus of any of Aspects 1 to 12, wherein display data includes image content captured by the first image sensor.

Aspect 14: The apparatus of any of Aspects 1 to 13, wherein the one or more processors are configured to: generate virtual content that is distinct from content captured by the first image sensor, wherein the display data includes virtual content.

Aspect 15: The apparatus of any of Aspects 1 to 14, wherein the display is at least partially transmissive to light passing from the first direction to the second direction.

Aspect 16: The apparatus of any of Aspects 1 to 15, wherein the one or more processors are configured to: receive second image capture information from the second camera, wherein the second image capture information is associated with capture of third image data by the second image sensor before capture of the second image data by the second image sensor, and wherein, to determine the image capture setting for the second camera based on the capture information and the display data, the one or more processors are configured to determine the image capture setting for the second camera based on the capture information and the second image capture information and the display data.

Aspect 17: The apparatus of Aspect 16, wherein the second image capture information includes the third image data.

Aspect 18: The apparatus of any of Aspects 16 or 17, wherein the one or more processors are configured to: determine a measure of luminance of at least a portion of the third image data, wherein, to determine the image capture setting for the second camera based on the capture information and the second image capture information and the display data, the one or more processors are configured to determine the image capture setting for the second camera based on the measure of luminance.

Aspect 19: The apparatus of any of Aspects 16 to 18, wherein the second image capture information includes a second image capture setting, wherein the second image sensor captures the third image data according to the second image capture setting.

Aspect 20: The apparatus of any of Aspects 1 to 19, wherein the one or more processors are configured to: determine a level of illumination of a portion of a user based on the capture information and the display data, wherein, to determine the image capture setting for the second camera based on the capture information, the one or more processors are configured to determine the image capture setting for the second image sensor based on the level of illumination of the portion of the user.

Aspect 21: The apparatus of Aspect 20, wherein, to determine the level of illumination of the portion of the user, the one or more processors are configured to determine the level of illumination of the portion of the user based on the capture information and on second image capture information that is associated with capture of third image data by the second image sensor before capture of the second image data by the second image sensor.

Aspect 22: The apparatus of any of Aspects 1 to 21, wherein the one or more processors are configured to: receive the second image data captured by the second image sensor; and output the second image data.

Aspect 23: The apparatus of any of Aspects 1 to 22, wherein the one or more processors are configured to: receive the second image data captured by the second image sensor; and determine a position of an eye of a user based on the second image data.

Aspect 24: The apparatus of any of Aspects 1 to 23, wherein the first direction faces toward an environment, and wherein the second direction faces toward at least a portion of a user.

Aspect 25: The apparatus of any of Aspects 1 to 24, wherein the first direction is parallel and opposite to the second direction.

Aspect 26: The apparatus of any of Aspects 1 to 25, wherein the first image data includes a depiction of at least a portion of an environment, and wherein the second image data includes a depiction of at least a portion of a user.

Aspect 27: The apparatus of any of Aspects 1 to 26, wherein the second image data includes a depiction of one or more eyes of a user.

Aspect 28: The apparatus of any of Aspects 1 to 27, further comprising: the first image sensor; and the second image sensor.

Aspect 29: The apparatus of any of Aspects 1 to 28, wherein the apparatus includes a head-mounted display.

Aspect 30: An apparatus for automatic capture setting configuration, the apparatus comprising: at least one memory; and one or more processors coupled to the at least one memory, the one or more processors configured to: receive capture information from a first camera with a first image sensor, wherein the capture information is associated with capture of first image data by the first image sensor, and wherein the first image sensor faces a first direction; receive display data that is configured to be displayed using a display; based on the capture information and the display data, determine an image capture setting for a second camera that includes a second image sensor, wherein the second image sensor faces a second direction; and cause the second image sensor to capture second image data according to the image capture setting.

Aspect 31: The apparatus of Aspect 30, wherein the image capture setting includes an exposure setting, and wherein, to cause the second image sensor to capture the second image data according to the image capture setting, the one or more processors are configured to set an exposure parameter associated with the second camera according the exposure setting.

Aspect 32: The apparatus of any of Aspects 30 to 31, wherein the image capture setting includes a white balance setting that based on color information associated with the capture information.

Aspect 33: The apparatus of any of Aspects 30 to 32, wherein the capture information includes the first image data.

Aspect 34: The apparatus of Aspect 33, further comprising: determining a measure of luminance of at least a portion of the first image data, wherein determine the image capture setting for the second camera based on the capture information and the display data includes determining the image capture setting for the second camera based on the measure of luminance.

Aspect 35: The apparatus of any of Aspects 30 to 34, wherein the capture information includes a second image capture setting, and wherein the first image sensor is configured to capture the first image data according to the second image capture setting.

Aspect 36: The apparatus of any of Aspects 30 to 35, wherein the second image capture setting includes an exposure setting, and wherein the first image sensor is configured to capture the first image data with an exposure parameter of the first camera according to the exposure setting.

Aspect 37: The apparatus of any of Aspects 35 or 36, wherein, to determine the image capture setting for the second camera based on the capture information and the display data, the one or more processors are configured to determine the image capture setting for the second camera based on the second image capture setting and a look-up table, the look-up table mapping respective image capture settings between the first camera and the second camera, and wherein the image capture setting corresponds to the second image capture setting in the look-up table.

Aspect 38: The apparatus of any of Aspects 30 to 37, wherein, to receive the display data, the one or more processors are configured to receive the display data from a display buffer that stores the display data before the display data is displayed using the display.

Aspect 39: The apparatus of any of Aspects 30 to 38, wherein the one or more processors are configured to: determine a measure of luminance of at least a portion of the display data, wherein, to determine the image capture setting for the second camera based on the capture information and the display data, the one or more processors are configured to determine the image capture setting for the second camera based on the measure of luminance.

Aspect 40: The apparatus of any of Aspects 30 to 39, further comprising: the display configured to display the display data.

Aspect 41: The apparatus of any of Aspects 30 to 40, wherein the display is configured to direct light corresponding to the display data toward the second direction.

Aspect 42: The apparatus of any of Aspects 30 to 41, wherein display data includes image content captured by the first image sensor.

Aspect 43: The apparatus of any of Aspects 30 to 42, wherein the one or more processors are configured to: generate virtual content that is distinct from content captured by the first image sensor, wherein the display data includes virtual content.

Aspect 44: The apparatus of any of Aspects 30 to 43, wherein the display is at least partially transmissive to light passing from the first direction to the second direction.

Aspect 45: The apparatus of any of Aspects 30 to 44, wherein the one or more processors are configured to: receive second image capture information from the second camera, wherein the second image capture information is associated with capture of third image data by the second image sensor before capture of the second image data by the second image sensor, and wherein, to determine the image capture setting for the second camera based on the capture information and the display data, the one or more processors are configured to determine the image capture setting for the second camera based on the capture information and the second image capture information and the display data.

Aspect 46: The apparatus of Aspect 45, wherein the second image capture information includes the third image data.

Aspect 47: The apparatus of any of Aspects 45 or 46, wherein the one or more processors are configured to: determine a measure of luminance of at least a portion of the third image data, wherein, to determine the image capture setting for the second camera based on the capture information and the second image capture information and the display data, the one or more processors are configured to determine the image capture setting for the second camera based on the measure of luminance.

Aspect 48: The apparatus of any of Aspects 45 to 47, wherein the second image capture information includes a second image capture setting, wherein the second image sensor captures the third image data according to the second image capture setting.

Aspect 49: The apparatus of any of Aspects 30 to 48, wherein the one or more processors are configured to: determine a level of illumination of a portion of a user based on the capture information and the display data, wherein, to determine the image capture setting for the second camera based on the capture information, the one or more processors are configured to determine the image capture setting for the second image sensor based on the level of illumination of the portion of the user.

Aspect 50: The apparatus of Aspect 49, wherein, to determine the level of illumination of the portion of the user, the one or more processors are configured to determine the level of illumination of the portion of the user based on the capture information and on second image capture information that is associated with capture of third image data by the second image sensor before capture of the second image data by the second image sensor.

Aspect 51: The apparatus of any of Aspects 30 to 50, wherein the one or more processors are configured to:

receive the second image data captured by the second image sensor; and output the second image data.

Aspect 52: The apparatus of any of Aspects 30 to 51, wherein the one or more processors are configured to: receive the second image data captured by the second image sensor; and determine a position of an eye of a user based on the second image data.

Aspect 53: The apparatus of any of Aspects 30 to 52, wherein the first direction faces toward an environment, and wherein the second direction faces toward at least a portion of a user.

Aspect 54: The apparatus of any of Aspects 30 to 53, wherein the first direction is parallel and opposite to the second direction.

Aspect 55: The apparatus of any of Aspects 30 to 54, wherein the first image data includes a depiction of at least a portion of an environment, and wherein the second image data includes a depiction of at least a portion of a user.

Aspect 56: The apparatus of any of Aspects 30 to 55, wherein the second image data includes a depiction of one or more eyes of a user.

Aspect 57: The apparatus of any of Aspects 30 to 56, further comprising: the first image sensor; and the second image sensor.

Aspect 58: The apparatus of any of Aspects 30 to 57, wherein the apparatus includes a head-mounted display.

Aspect 59: A non-transitory computer-readable medium having stored thereon instructions that, when executed by one or more processors, cause the one or more processors to perform operations according to any of Aspects 1 to 58.

Aspect 60: An apparatus for image processing, the apparatus comprising one or more means for performing operations according to any of Aspects 1 to 58.

What is claimed is:

1. An apparatus for automatic capture setting configuration, the apparatus comprising:
   at least one memory; and
   at least one processor coupled to the at least one memory, the at least one processor configured to:
   receive capture information from a first camera with a first image sensor, wherein the capture information is associated with capture of first image data by the first image sensor, wherein the first image sensor faces a first direction toward an environment;
   receive display data that is configured to be displayed using a display;
   determine, based on at least a characteristic of illumination of a user, an image capture setting for a second camera that includes a second image sensor, wherein the second image sensor faces a second direction toward the user, wherein the characteristic of illumination of the user is based on the capture information and the display data; and
   cause the second image sensor to capture second image data according to the image capture setting.

2. The apparatus of claim 1, wherein the image capture setting includes an exposure setting, and wherein, to cause the second image sensor to capture the second image data according to the image capture setting, the at least one processor is configured to set an exposure parameter associated with the second camera according the exposure setting.

3. The apparatus of claim 1, wherein the image capture setting includes a white balance setting that is based on color information, wherein the characteristic of illumination of the user includes the color information.

4. The apparatus of claim 1, wherein the capture information includes the first image data.

5. The apparatus of claim 4, wherein the at least one processor is configured to:
   determine a measure of luminance of at least a portion of the first image data to determine the characteristic of illumination of the user.

6. The apparatus of claim 1, wherein the capture information includes a second image capture setting, and wherein the first image sensor is configured to capture the first image data according to the second image capture setting.

7. The apparatus of claim 6, wherein the second image capture setting includes an exposure setting, and wherein the first image sensor is configured to capture the first image data with an exposure parameter of the first camera according to the exposure setting.

8. The apparatus of claim 6, wherein, to determine the image capture setting for the second camera, the at least one processor is configured to determine the image capture setting for the second camera based on the second image capture setting and a look-up table, the look-up table mapping respective image capture settings between the first camera and the second camera, and wherein the image capture setting corresponds to the second image capture setting in the look-up table.

9. The apparatus of claim 1, wherein, to receive the display data, the at least one processor is configured to receive the display data from a display buffer that stores the display data before the display data is displayed using the display.

10. The apparatus of claim 1, wherein the at least one processor is configured to:
    determine a measure of luminance of at least a portion of the display data to determine the characteristic of illumination of the user.

11. The apparatus of claim 1, further comprising:
    the display configured to display the display data.

12. The apparatus of claim 1, wherein the display is configured to direct light corresponding to the display data toward the second direction.

13. The apparatus of claim 1, wherein display data includes image content captured by the first image sensor.

14. The apparatus of claim 1, wherein the at least one processor is configured to:
    generate virtual content that is distinct from content captured by the first image sensor, wherein the display data includes virtual content.

15. The apparatus of claim 1, wherein the display is at least partially transmissive to light passing from the first direction to the second direction.

16. The apparatus of claim 1, wherein the at least one processor is configured to:
    receive second image capture information from the second camera, wherein the second image capture information is associated with capture of third image data by the second image sensor before capture of the second image data by the second image sensor, and wherein, to determine the image capture setting for the second camera, the at least one processor is configured to determine the image capture setting for the second camera based on the capture information and the second image capture information and the display data.

17. The apparatus of claim 16, wherein the second image capture information includes the third image data.

18. The apparatus of claim 16, wherein the at least one processor is configured to:
  determine a measure of luminance of at least a portion of the third image data to determine the characteristic of illumination of the user.

19. The apparatus of claim 16, wherein the second image capture information includes a second image capture setting, wherein the second image sensor captures the third image data according to the second image capture setting.

20. The apparatus of claim 1, wherein the at least one processor is configured to:
  determine a level of illumination of a portion of the user based on the capture information and the display data to determine the characteristic of illumination of the user.

21. The apparatus of claim 20, wherein, to determine the level of illumination of the portion of the user, the at least one processor is configured to determine the level of illumination of the portion of the user based on the capture information and on second image capture information that is associated with capture of third image data by the second image sensor before capture of the second image data by the second image sensor.

22. The apparatus of claim 1, wherein the at least one processor is configured to:
  receive the second image data captured by the second image sensor; and
  output the second image data.

23. The apparatus of claim 1, wherein the at least one processor is configured to:
  receive the second image data captured by the second image sensor; and
  determine a position of an eye of the user based on the second image data.

24. The apparatus of claim 1, wherein the second direction faces toward at least one eye of the user.

25. The apparatus of claim 1, wherein the first direction is parallel and opposite to the second direction.

26. The apparatus of claim 1, wherein the first image data includes a depiction of at least a portion of the environment, and wherein the second image data includes a depiction of at least a portion of the user.

27. The apparatus of claim 1, wherein the display data includes the first image data.

28. The apparatus of claim 1, further comprising:
  the first image sensor; and
  the second image sensor.

29. The apparatus of claim 1, wherein the apparatus includes a head-mounted display.

30. A method for automatic capture setting configuration, the method comprising:
  receiving capture information from a first camera with a first image sensor, wherein the capture information is associated with capture of first image data by the first image sensor, wherein the first image sensor faces a first direction toward an environment;
  receiving display data that is configured to be displayed using a display;
  determining, based on at least a characteristic of illumination of a user, an image capture setting for a second camera that includes a second image sensor, wherein the second image sensor faces a second direction toward the user, wherein the characteristic of illumination of the user is based on the capture information and the display data; and
  causing the second image sensor to capture second image data according to the image capture setting.

31. The method of claim 30, wherein the image capture setting includes an exposure setting, and wherein causing the second image sensor to capture the second image data according to the image capture setting includes setting an exposure parameter associated with the second camera according the exposure setting.

32. The method of claim 30, wherein the image capture setting includes a white balance setting that is based on color information, wherein the characteristic of illumination of the user includes the color information.

33. The method of claim 30, wherein the capture information includes the first image data.

34. The method of claim 33, further comprising:
  determining a measure of luminance of at least a portion of the first image data, wherein determining the image capture setting for the second camera includes determining the image capture setting for the second camera based on the measure of luminance.

35. The method of claim 30, wherein the capture information includes a second image capture setting, and wherein the first image sensor is configured to capture the first image data according to the second image capture setting.

36. The method of claim 30, wherein receiving the display data includes receiving the display data from a display buffer that stores the display data before the display data is displayed using the display.

37. The method of claim 30, further comprising:
  determining a measure of luminance of at least a portion of the display data to determine the characteristic of illumination of the user.

38. The method of claim 30, wherein the second direction faces toward at least one eye of the user.

39. The method of claim 30, wherein the first image data includes a depiction of at least a portion of the environment, and wherein the second image data includes a depiction of at least a portion of the user.

40. The method of claim 30, wherein the display data includes the first image data.

* * * * *